United States Patent
Tsou et al.

(10) Patent No.: US 11,995,624 B2
(45) Date of Patent: May 28, 2024

(54) SYSTEM-BASED DETECTION OF CARD SHARING AND FRAUD

(71) Applicant: Block, Inc., San Francisco, CA (US)

(72) Inventors: Victor Tsou, Oakland, CA (US); Damon McCormick, Oakland, CA (US); Kathryne Hawthorne, San Francisco, CA (US); Alan Fineberg, San Francisco, CA (US)

(73) Assignee: Block, Inc., Oakland, CA (US)

( * ) Notice: Subject to any disclaimer, the term of this patent is extended or adjusted under 35 U.S.C. 154(b) by 226 days.

(21) Appl. No.: 17/470,816

(22) Filed: Sep. 9, 2021

(65) Prior Publication Data
US 2022/0083997 A1 Mar. 17, 2022

Related U.S. Application Data

(63) Continuation of application No. 16/853,424, filed on Apr. 20, 2020, now Pat. No. 11,151,531, which is a
(Continued)

(51) Int. Cl.
*G06Q 20/12* (2012.01)
*G06Q 20/04* (2012.01)
*G06Q 20/40* (2012.01)

(52) U.S. Cl.
CPC .......... *G06Q 20/12* (2013.01); *G06Q 20/047* (2020.05); *G06Q 20/4014* (2013.01); *G06Q 20/405* (2013.01)

(58) Field of Classification Search
CPC .. G06Q 20/401; G06Q 20/4014; G06Q 20/12; G06Q 20/40; G06Q 20/405; G06Q 20/047
See application file for complete search history.

(56) References Cited

U.S. PATENT DOCUMENTS

| 4,035,614 A | 7/1977 | Frattarola et al. |
| 4,254,441 A | 3/1981 | Fisher |

(Continued)

FOREIGN PATENT DOCUMENTS

| CA | 3 016 616 A1 | 9/2017 |
| JP | 2004-78662 A | 3/2004 |

(Continued)

OTHER PUBLICATIONS

"2.5mm Headset Jack," Retrieved from the Internet URL: http://www.phonescoop.com/glossary/term.php?gid=360, on May 5, 2011, pp. 1-1.
(Continued)

*Primary Examiner* — Scott S Trotter
(74) *Attorney, Agent, or Firm* — Lee & Hayes P.C.

(57) ABSTRACT

This disclosure describes, in part, a payment service that associates customer profiles with an identifier of a payment instrument, and then uses the customer profiles to identify a customer that is using the payment instrument during a transaction with a merchant. For instance, in some examples, the payment service can identify preferences of customers using transaction information that includes an identifier for a payment instrument, and associate the preferences with respective customer profiles. The payment service can then receive transaction information associated with a transaction between a customer and a merchant, identify preferences of the customer using the transaction information, compare the preferences of the customer with preferences stored in the customer profiles, and identify the customer based on the comparing. The payment service can further generate a receipt for the transaction and send the receipt to contact information of the customer.

20 Claims, 15 Drawing Sheets

Related U.S. Application Data continuation of application No. 15/070,353, filed on Mar. 15, 2016, now Pat. No. 10,628,811.

(56) References Cited

U.S. PATENT DOCUMENTS

| | | |
|---|---|---|
| 4,591,937 A | 5/1986 | Nakarai et al. |
| 4,609,957 A | 9/1986 | Gentet et al. |
| 4,845,740 A | 7/1989 | Tokuyama et al. |
| 5,266,789 A | 11/1993 | Anglin et al. |
| 5,434,400 A | 7/1995 | Scherzer |
| 5,463,678 A | 10/1995 | Kepley, III et al. |
| 5,589,855 A | 12/1996 | Blumstein et al. |
| 5,603,078 A | 2/1997 | Henderson et al. |
| 5,729,591 A | 3/1998 | Bailey |
| 5,764,742 A | 6/1998 | Howard et al. |
| 5,850,599 A | 12/1998 | Seiderman |
| 5,878,337 A | 3/1999 | Joao et al. |
| 5,945,654 A | 8/1999 | Huang |
| 5,991,749 A | 11/1999 | Morrill, Jr. |
| 6,006,109 A | 12/1999 | Shin |
| 6,021,944 A | 2/2000 | Arakaki |
| 6,032,859 A | 3/2000 | Muehlberger et al. |
| 6,061,666 A | 5/2000 | Do et al. |
| 6,129,277 A | 10/2000 | Grant et al. |
| 6,234,389 B1 | 5/2001 | Valliani et al. |
| 6,308,227 B1 | 10/2001 | Kumar et al. |
| 6,341,353 B1 | 1/2002 | Herman et al. |
| 6,363,139 B1 | 3/2002 | Zurek et al. |
| 6,400,517 B1 | 6/2002 | Murao |
| 6,431,445 B1 | 8/2002 | DeLand, Jr. et al. |
| 6,476,743 B1 | 11/2002 | Brown et al. |
| 6,481,623 B1 | 11/2002 | Grant et al. |
| 6,497,368 B1 | 12/2002 | Friend et al. |
| 6,536,670 B1 | 3/2003 | Postman et al. |
| 6,579,728 B2 | 6/2003 | Grant et al. |
| 6,612,488 B2 | 9/2003 | Suzuki |
| 6,813,608 B1 | 11/2004 | Baranowski |
| 6,832,721 B2 | 12/2004 | Fujll |
| 6,850,147 B2 | 2/2005 | Prokoski et al. |
| 6,868,391 B1 | 3/2005 | Hultgren |
| 6,896,182 B2 | 5/2005 | Sakaguchi |
| 6,898,598 B2 | 5/2005 | Himmel et al. |
| 6,944,782 B2 | 9/2005 | von Mueller et al. |
| 7,003,316 B1 | 2/2006 | Elias et al. |
| 7,013,149 B2 | 3/2006 | Vetro et al. |
| 7,149,296 B2 | 12/2006 | Brown et al. |
| 7,163,148 B2 | 1/2007 | Durbin et al. |
| 7,167,711 B1 | 1/2007 | Dennis |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,343,317 B2 | 3/2008 | Jokinen et al. |
| 7,363,054 B2 | 4/2008 | Elias et al. |
| 7,409,234 B2 | 8/2008 | Glezerman |
| 7,433,452 B2 | 10/2008 | Taylor et al. |
| 7,505,762 B2 | 3/2009 | Onyon et al. |
| 7,506,812 B2 | 3/2009 | von Mueller et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| 7,634,428 B1 | 12/2009 | Varatharajah |
| 7,708,189 B1 | 5/2010 | Cipriano |
| 7,764,185 B1 | 7/2010 | Manz et al. |
| 7,793,834 B2 | 9/2010 | Hachey et al. |
| 7,810,729 B2 | 10/2010 | Morley, Jr. |
| 7,869,591 B1 | 1/2011 | Nagel et al. |
| 7,896,248 B2 | 3/2011 | Morley, Jr. |
| 7,918,394 B1 | 4/2011 | Morley, Jr. |
| 7,945,494 B2 | 5/2011 | Williams |
| 8,015,070 B2 | 9/2011 | Sinha et al. |
| 8,228,299 B1 | 7/2012 | Maloney et al. |
| 8,231,055 B2 | 7/2012 | Wen |
| 8,281,998 B2 | 10/2012 | Tang et al. |
| 8,376,239 B1 | 2/2013 | Humphrey |
| 8,965,791 B1 | 2/2015 | Bell et al. |
| 9,947,020 B2 | 4/2018 | Fordyce, III et al. |
| 10,628,811 B2 | 4/2020 | Tsou et al. |
| 10,636,019 B1 | 4/2020 | Abrons |
| 2001/0001856 A1 | 5/2001 | Gould et al. |
| 2001/0023402 A1 | 9/2001 | Flynn |
| 2001/0029470 A1 | 10/2001 | Schultz et al. |
| 2001/0029484 A1 | 10/2001 | Schultz et al. |
| 2002/0002507 A1 | 1/2002 | Hatakeyama |
| 2002/0016765 A1 | 2/2002 | Sacks |
| 2002/0030871 A1 | 3/2002 | Anderson et al. |
| 2002/0073043 A1 | 6/2002 | Herman et al. |
| 2002/0077974 A1 | 6/2002 | Ortiz |
| 2002/0099648 A1 | 7/2002 | DeVoe et al. |
| 2002/0108062 A1 | 8/2002 | Nakajima et al. |
| 2002/0169541 A1 | 11/2002 | Bouve et al. |
| 2002/0188535 A1 | 12/2002 | Chao et al. |
| 2002/0188559 A1 | 12/2002 | Schultz |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2003/0158819 A1 | 8/2003 | Scott |
| 2003/0182204 A1 | 9/2003 | Rhee |
| 2003/0204447 A1 | 10/2003 | Dalzell et al. |
| 2003/0217005 A1 | 11/2003 | Drummond et al. |
| 2003/0220835 A1 | 11/2003 | Barnes, Jr. |
| 2004/0012875 A1 | 1/2004 | Wood |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Krouse et al. |
| 2004/0204074 A1 | 10/2004 | Desai |
| 2004/0230489 A1 | 11/2004 | Goldthwaite et al. |
| 2004/0230526 A1 | 11/2004 | Praisner |
| 2005/0077870 A1 | 4/2005 | Ha et al. |
| 2005/0209719 A1 | 9/2005 | Beckert et al. |
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2006/0049255 A1 | 3/2006 | von Mueller et al. |
| 2006/0094481 A1 | 5/2006 | Gullickson |
| 2006/0122902 A1 | 6/2006 | Petrov et al. |
| 2006/0208066 A1 | 9/2006 | Finn et al. |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255653 A1 | 11/2007 | Tumminaro et al. |
| 2007/0272740 A1 | 11/2007 | Palacios |
| 2008/0027815 A1 | 1/2008 | Johnson et al. |
| 2008/0040265 A1 | 2/2008 | Rackley, III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0099375 A1 | 5/2008 | Andau et al. |
| 2008/0103972 A1 | 5/2008 | Lanc |
| 2008/0147564 A1 | 6/2008 | Singhal |
| 2008/0172306 A1 | 7/2008 | Schorr et al. |
| 2008/0177624 A9 | 7/2008 | Dohse |
| 2008/0177662 A1 | 7/2008 | Smith et al. |
| 2008/0197188 A1 | 8/2008 | Jagatic et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2009/0068982 A1 | 3/2009 | Chen et al. |
| 2009/0098908 A1 | 4/2009 | Silverbrook et al. |
| 2009/0100168 A1 | 4/2009 | Harris |

(56) References Cited

U.S. PATENT DOCUMENTS

| | | |
|---|---|---|
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0187492 A1 | 7/2009 | Hammad et al. |
| 2009/0271322 A1 | 10/2009 | Lay et al. |
| 2009/0292591 A1 | 11/2009 | Schultz et al. |
| 2010/0059587 A1* | 3/2010 | Miller ............... G06Q 20/4014 235/379 |
| 2010/0063893 A1 | 3/2010 | Townsend |
| 2010/0082490 A1 | 4/2010 | Rosenblatt et al. |
| 2010/0174915 A1 | 7/2010 | Prokin |
| 2010/0184479 A1 | 7/2010 | Griffin, Jr. |
| 2010/0191653 A1 | 7/2010 | Johnson et al. |
| 2010/0222000 A1 | 9/2010 | Sauer et al. |
| 2010/0241536 A1 | 9/2010 | Tanaka |
| 2010/0243732 A1 | 9/2010 | Wallner |
| 2010/0259559 A1 | 10/2010 | Schneider |
| 2010/0263018 A1 | 10/2010 | Cozart et al. |
| 2010/0269059 A1 | 10/2010 | Olthmeret et al. |
| 2011/0040624 A1 | 2/2011 | Jhanji |
| 2011/0084139 A1 | 4/2011 | McKelvey et al. |
| 2011/0084147 A1 | 4/2011 | Wilson et al. |
| 2011/0087596 A1 | 4/2011 | Dorsey |
| 2011/0137803 A1 | 6/2011 | Willins |
| 2011/0145082 A1 | 6/2011 | Hammad |
| 2011/0161235 A1 | 6/2011 | Beenau et al. |
| 2011/0174879 A1 | 7/2011 | Morley, Jr. |
| 2011/0180601 A1 | 7/2011 | Morley, Jr. |
| 2011/0191196 A1 | 8/2011 | Orr et al. |
| 2011/0198395 A1 | 8/2011 | Chen |
| 2011/0202463 A1 | 8/2011 | Powell |
| 2011/0258120 A1 | 10/2011 | Weiss |
| 2011/0259957 A1 | 10/2011 | Tsai |
| 2011/0313880 A1 | 12/2011 | Paul et al. |
| 2012/0008851 A1 | 1/2012 | Pennock et al. |
| 2012/0012653 A1 | 1/2012 | Johnson et al. |
| 2012/0016794 A1 | 1/2012 | Orr et al. |
| 2012/0022930 A1 | 1/2012 | Brouhard |
| 2012/0022944 A1 | 1/2012 | Volpi |
| 2012/0078736 A1 | 3/2012 | Denzer et al. |
| 2012/0173348 A1 | 7/2012 | Yoo et al. |
| 2012/0246074 A1 | 9/2012 | Annamalai et al. |
| 2012/0290472 A1 | 11/2012 | Mullen et al. |
| 2012/0290609 A1 | 11/2012 | Britt |
| 2013/0085941 A1 | 4/2013 | Rosenblatt et al. |
| 2013/0110607 A1 | 5/2013 | Basmajian et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0144792 A1 | 6/2013 | Nilsson et al. |
| 2013/0155474 A1 | 6/2013 | Roach et al. |
| 2013/0212655 A1 | 8/2013 | Hoyos et al. |
| 2013/0246207 A1 | 9/2013 | Novak et al. |
| 2013/0246301 A1 | 9/2013 | Radhakrishnan et al. |
| 2013/0290187 A1 | 10/2013 | Itwaru |
| 2014/0052613 A1 | 2/2014 | Tavakoli et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0164151 A1 | 6/2014 | Hockley |
| 2014/0180826 A1 | 6/2014 | Boal |
| 2014/0189886 A1 | 7/2014 | Patterson |
| 2014/0249999 A1 | 9/2014 | Johnson et al. |
| 2015/0073989 A1 | 3/2015 | Green et al. |
| 2015/0120509 A1 | 4/2015 | Moring et al. |
| 2015/0154581 A1 | 6/2015 | Dorsey |
| 2015/0356570 A1 | 12/2015 | Goldsmid et al. |
| 2015/0363757 A1 | 12/2015 | Mocko et al. |
| 2016/0027042 A1 | 1/2016 | Heeter |
| 2016/0042339 A1 | 2/2016 | Nichols |
| 2016/0342992 A1 | 11/2016 | Lee |
| 2017/0270505 A1 | 9/2017 | Tsou et al. |
| 2020/0250641 A1 | 8/2020 | Tsou et al. |
| 2020/0273005 A1 | 8/2020 | Abrons |
| 2021/0166211 A1 | 6/2021 | Dorsey |
| 2022/0383277 A1 | 12/2022 | Abrons |

FOREIGN PATENT DOCUMENTS

| | | |
|---|---|---|
| JP | 2005-269172 A | 9/2005 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 2010/097711 A2 | 9/2010 |
| WO | 2010/111130 A2 | 9/2010 |
| WO | 2010/135174 A1 | 11/2010 |
| WO | 2011/047042 A2 | 4/2011 |
| WO | 2015/106206 A1 | 7/2015 |
| WO | 2017/160454 A1 | 9/2017 |

OTHER PUBLICATIONS

"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.

Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.

"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-SID . . . , on Apr. 19, 2011, pp. 1-2.

"Arduino magnetic stripe decoder," Instructables, Retrieved from the Internet URL: http://www.instructables.com/id/Arduino-magneticstripe-decorder/, on Feb. 8, 2011, pp. 1-5.

"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.

Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.

"Get paid on the spot from your mobile phone," Retrieved from the Internet URL: http://payments.intuit.com/products/basic-payment-solutions/mobile-credit-card-processin . . . , on Feb. 11, 2011, pp. 1-3.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Grandison, K., "vTerminal Credit Card Processing App for AuthorizeNet and PayPal Payflow Pro For Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.

Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.

"Headphone Jack (3.5mm)," Retrieved from the Internet URL: http://www.phonescoop.com/glossary/term.php? gid=440, on May 5, 2011, pp. 1-1.

(56) References Cited

OTHER PUBLICATIONS

Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.

Kuo, Y-S., et al., "Hijacking Power and Bandwidth from the Mobile Phone's Audio Interface," Proceedings of the First ACM Symposium on Computing for Development, (DEV'10), Dec. 17, 2010, pp. 1-10.

"Magnetic Card Reader," lekernel.net~scrapbook, Retrieved from the Internet URL: http://lekernel.net/scrapbook/old/cardreader.html, on Apr. 25, 2011, pp. 1-4.

"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.

"Magnetic stripe reader/writer," Retrieved from the Internet URL: http://www.gae.ucm.es/-padilla/extrawork/stripe.html, on Dec. 21, 2009, pp. 1-2.

"Mag-stripe readers The hunt for a homebrew mag-stripe reader that'll work with modem," Jan. 16, 2009, Retrieved from the Internet URL: http://www.hak5.org/forums/index.php?showtopic=11563&st=20, on Apr. 25, 2011, pp. 1-6.

"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.

"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.

"Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44".

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

"Online Shopping," dated Nov. 2, 2014, Retrieved from the Internet URL: http://en.wikipedia.org/wiki/Online_shopping, on Nov. 10, 2014, pp. 1-12.

Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.

Padilla, L., "The simplest magnetic stripe reader," Jan. 27, 2003, Retrieved from the Internet URL: www.gae.ucm.esi~padilla/extrawork/soundtrack.html, on Dec. 21, 2009, pp. 1-5.

Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.

"Pay@PC," Retrieved from the Internet URL: http://www.merchantanywhere.com/PAY_AT_PCT@PC.htm, on Feb. 11, 2011, pp. 1-2.

"Payment Gateway," Wikipedia, published May 30, 2014, Retrieved from the Internet URL: http://en.wikipedia.org/wiki/Payment gateways, on Jun. 6, 2014, pp. 1-3.

"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.

"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.

"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.

"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.

Titlow, J.P., "Roam pay is like Square for Blackberry (Plus Android, IOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.

"TOUCH-PAY Wireless Credit Card Processing," MerchantSeek, Retrieved from the Internet URL: http://www.merchantseek.com/wireless-credit-card-processing.htm, on Feb. 11, 2011, pp. 1-5.

"Travel industry targeted for Palm PDA card reader," Retrieved from the Internet URL: http://www.m-travel.com/news/2001/08/travel_industry.html, on Apr. 19, 2011, pp. 1-2.

"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.

"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.

Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

Website: www.alexwinston.com, Aug. 31, 2009, pp. 1-5.

Non Final Office Action dated Apr. 20, 2012 for U.S. Appl. No. 12/903,828, of Dorsey, J., filed Oct. 13, 2010.

Final Office Action dated Aug. 30, 2012 for U.S. Appl. No. 12/903,828, of Dorsey, J., filed Oct. 13, 2010.

Non Final Office Action dated May 28, 2014 for U.S. Appl. No. 12/903,828, of Dorsey, J., filed Oct. 13, 2010.

Final Office Action dated Nov. 24, 2014 for U.S. Appl. No. 12/903,828, of Dorsey, J., filed Oct. 13, 2010.

Non Final Office Action dated Dec. 20, 2017, for U.S. Appl. No. 14/615,257 of Dorsey, J., filed Feb. 5, 2015.

Final Office Action dated Jun. 6, 2018, for U.S. Appl. No. 14/615,257, of Dorsey, J., filed Feb. 5, 2015.

Non-Final Office Action dated Jul. 20, 2018, for U.S. Appl. No. 15/087,960, of Abrons, A., filed Mar. 31, 2016.

Non-Final Office Action dated Aug. 10, 2018, for U.S. Appl. No. 15/070,353, of Tsou, V., et al., filed Mar. 15, 2016.

Non-Final Office Action dated Apr. 1, 2022, for U.S. Appl. No. 17/095,473, of Dorsey, J., et al., filed Nov. 11, 2020.

Notice of Allowance dated Apr. 12, 2022, for U.S. Appl. No. 16/859,639, of Abrons, A., filed Apr. 27, 2020.

Corrected Notice of Allowability dated May 10, 2022, for U.S. Appl. No. 16/859,639, of Abrons, A., filed Apr. 27, 2020.

Final Office Action dated Jul. 19, 2022, for U.S. Appl. No. 17/095,473, of Dorsey, J., filed Nov. 11, 2020.

Non-Final Office Action dated Oct. 4, 2018, for U.S. Appl. No. 15/070,675, of Tsou, V., et al., filed Mar. 15, 2016.

Final Office Action dated Jan. 14, 2019, for U.S. Appl. No. 15/087,960, of Abrons, A., filed Mar. 31, 2016.

Final Office Action dated Jan. 17, 2019, for U.S. Appl. No. 15/070,353, of Tsou, V., et al., filed Mar. 15, 2016.

Non Final Office Action dated Mar. 6, 2019, for U.S. Appl. No. 14/615,257 of Dorsey, J., filed Feb. 5, 2015.

Advisory Action dated Mar. 27, 2019, for U.S. Appl. No. 15/070,353, of Tsou, V et al., of filed Mar. 15, 2016.

Advisory Action dated Mar. 28, 2019, for U.S. Appl. No. 15/087,960 of Abrons, A et al., of filed Mar. 31, 2016.

Notice of Allowance dated Apr. 17, 2019, for U.S. Appl. No. 15/070,675, of Tsou, V., et al., filed Mar. 15, 2016.

Non-Final Office Action dated May 3, 2019, for U.S. Appl. No. 15/087,960, of Abrons, A., filed Mar. 31, 2016.

Non-Final Office Action dated Jul. 12, 2019, for U.S. Appl. No. 15/070,353, of Tsou, V., et al., filed Mar. 15, 201.

(56) References Cited

OTHER PUBLICATIONS

Notice of Allowance dated Dec. 11, 2019, for U.S. Appl. No. 15/070,353, of Tsou, V., et al., filed Mar. 15, 2016.
Notice of Allowance dated Dec. 12, 2019, for U.S. Appl. No. 15/087,960, of Abrons, A., filed Mar. 31, 2016.
Summon to Attend Oral Proceedings for European Patent Application No. 17709230.1, dated Jan. 23, 2020.
International Search Report and Written Opinion for International Application No. PCT/US2010/052499, dated May 26, 2011.
International Search Report and Written Opinion for International Application No. PCT/US2017/018056, dated Apr. 12, 2017.
Examiner Requisition for Canadian Patent Application No. 3,016,616, dated Jul. 19, 2019.
Examination Report, For European Patent Application No. 17709230.1, dated Aug. 9, 2019.
Examiner Requisition for Canadian Patent Application No. 3,016,616, dated Jun. 25, 2020.
Notice of Allowance dated Jun. 24, 2021, for U.S. Appl. No. 16/853,424, of Tsou, V. et al., filed Apr. 20, 2020.
Examiner Requisition for Canadian Patent Application No. 3,016,616, dated Mar. 26, 2021.
Notice of Allowance for Canadian Patent Application No. 3,016,616, dated Dec. 15, 2021.

\* cited by examiner

MERCHANT INTERFACE 302

PLEASE SELECT A TEMPLATE

RECEIPT TEMPLATE 304(1)

RECEIPT TEMPLATE 304(2)

RECEIPT TEMPLATE 304(3)

RECEIPT TEMPLATE 304(4)

RECEIPT TEMPLATE 304(5)

RECEIPT TEMPLATE 304(6)

Fig. 3

SYSTEM-BASED DETECTION OF CARD SHARING AND FRAUD

RELATED APPLICATION

This application is a continuation of, and claims priority to, U.S. patent application Ser. No. 16/853,424, filed on Apr. 20, 2020, entitled "SYSTEM-BASED DETECTION OF CARD SHARING AND FRAUD", which is a continuation of, and claims priority to, U.S. patent application Ser. No. 15/070,353, filed on Mar. 15, 2016, entitled "SYSTEM-BASED DETECTION OF CARD SHARING AND FRAUD", now known as U.S. Pat. No. 10,628,811, which issued on Apr. 21, 2020, and which is fully incorporated by reference herein.

BACKGROUND

A merchant conducts transactions for items and services with customers at both the merchant's physical establishment and using the merchant's online store. To conduct a transaction with a customer, the merchant can receive payment from the customer, such as in the form of a payment instrument, and process payment instrument for a cost of the transaction using a payment system. The merchant can then generate a receipt for the transaction using a point-of-sale (POS) device associated with the merchant. The receipt can include a physical receipt that the merchant hands to the customer, a digital receipt that the merchant sends a device of the customer, or both.

In some cases, two or more customers may use the same payment instrument when conducting transactions with a merchant. For example, a first customer may use the payment instrument to conduct a transaction with a first merchant. The first customer may then give the payment instrument to a second customer so that the second customer can conduct a transaction with the first merchant or a second merchant. For another example, the first customer and the second customer may each have his or her own physical payment instrument, where each of the physical payment instruments are associated with a single identifier (e.g., include a single account number).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example user interface for selecting one or more receipt templates. A point-of-sale (POS) device associated with a merchant may provide the user interface to the merchant.

DETAILED DESCRIPTION

Figure 1:
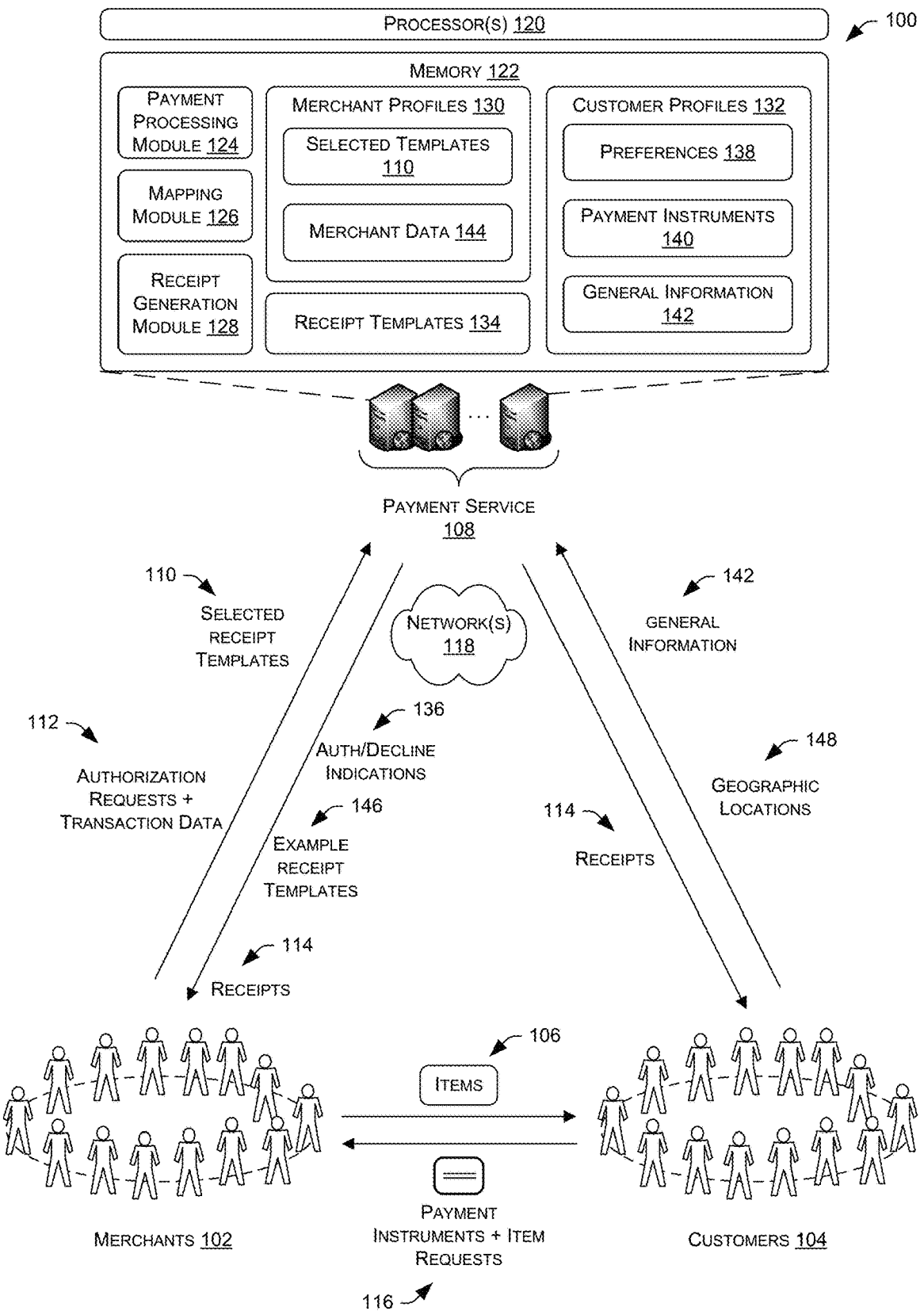
FIG. 1 illustrates an example environment that includes merchants that conduct transactions with customers for items, as well as a payment service to authorize payment instruments for the transactions. In this environment, the payment service receives selected templates along with requests to authorize transactions from merchant. The payment service then generates receipts for the transactions and sends the receipts to either the merchants, the customers that conducted the transactions with the merchants, or both.

This disclosure describes, in part, techniques for generating receipts at a payment service for both merchants and customers. In some examples, a payment service may store receipt templates for merchants. A receipt template can correspond to a customized receipt that is available for use by merchants when conducting transactions with customers. For instance, in some examples, each of the receipt templates can define a visual layout for a respective receipt, text included the respective receipt, and/or one or more graphics included the respective receipt.

The payment service can send data indicating one or more of the receipt templates to a point-of-sale (POS) device of a merchant. The POS device can then provide (e.g., display using a display) the merchant with a user interface that includes the one or more receipt templates. Utilizing the user interface, the merchant can select at least one of the receipt templates for use when conducting transactions with customers. In some examples, the merchant can further utilize the user interface to customize a selected receipt template. For instance, the user interface may provide the merchant with one or more options to change the layout of the receipt defined by the selected receipt template, change the text included in the receipt, or change the one or more graphics included in the receipt. The merchant can then use the POS device to send data indicating selected receipt templates to the payment system.

In some examples, the payment service can receive transaction information from the POS device. The transaction information can describe a transaction between the merchant and a customer. For instance, the transaction information can indicate an identifier of a payment instrument, an amount of payment received from the customer, item(s) acquired by the customer, a time, place and date of the transaction, and so forth. The payment service can use the transaction information and a receipt template selected by the merchant to generate a receipt for the merchant.

In some examples, after generating the receipt for the merchant, the payment service can send data representing the generated receipt to the POS device so that the merchant can provide the customer with the receipt. For instance, in some examples, the merchant can print a physical copy of the receipt and provide the physical copy of the receipt to the customer. In some examples, the merchant can use the POS device to send a digital copy of the receipt to a device associated with the customer.

Additionally or alternatively, in some examples, the payment service can send the data representing the receipt to a customer device of the customer. For instance, the payment service may store a customer profile associated with the customer. The customer profile can include data indicating general information for the customer (e.g., such as an identity of the customer, an age of the customer, gender of the customer, contact information for the customer, etc.), along with an identifier of a payment instrument associated with the customer. The customer profile can further include data indicating customer preferences of the customer. In some examples, the payment service identifies the customer preferences from previous transactions between the customer and merchants. For instance, the customer preferences can include items acquired by the customer during the previous transactions, times of the previous transactions, locations of merchants associated with the previous transactions, or the like. The payment service can use the customer profile to send the receipt to the contact information for the customer.

In some examples, more than one customer may use the payment instrument to conduct transactions with merchants. For instance, a husband and a wife may both use a common payment instrument for conducing transactions with merchants. In some examples, each of the customers may use the same physical payment instrument. For instance, a first customer may use the payment instrument at a first merchant to conduct a first transaction, and then a second customer may use the payment instrument at the first merchant and/or a second merchant to conduct a second transaction. Additionally or alternatively, in some examples, each customer may use his or her own physical payment instrument that includes an identifier (e.g., credit card number or other account number) for a common payment instrument. For instance, a husband may use a first payment instrument that is associated with an identifier at a first merchant while the wife uses a second payment instrument that is associated with the identifier at the first merchant and/or a second merchant.

In some examples, the payment service may first identify which customer is using the payment instrument before sending a receipt to the identified customer. To identify the customer, the payment service can use data associated with a transaction. For instance, the payment service may receive a request to authorize an account (e.g., account number) associated with the payment instrument for a cost of an item associated with the transaction. The payment service can use an identifier for the payment instrument to identify customer profiles that are associated with the payment instrument. For instance, the payment service can match the identifier of the payment instrument with an identifier of a payment instrument that is associated with respective customer profiles.

In some examples, after identifying customer profiles that are associated with the identifier of the payment instrument, the payment service uses one or more preferences associated with the transaction to identify which customer is using the payment instrument. For instance, the payment service may identify one or more preferences associated with the request to authorize the payment instrument for the transaction. The one or more preferences can include an item acquired during the transaction, a time of the transaction, a location of a merchant associated with the transaction, or the like.

In some examples, the payment service can then compare the one or more preferences of the transaction with customer preferences stored in each of the customer profiles that is associated with the payment instrument in order to identify the customer that is conducting the transaction. For instance, the payment service may match one or more of the item acquired during the transaction, the time of the transaction, or the location of the merchant associated with the transaction with items acquired during previous transactions, times of the previous transactions, or locations of merchants associated with the previous transactions stored in each of the customer profiles. In some examples, the payment service then identifies, based on the comparing, a customer profile that includes customer preferences that are most similar to the one or more preferences of the transaction. The payment service then identifies the customer that is conducting the transaction using the payment instrument as the customer is that is associated with the identified customer profile.

Additionally or alternatively, in some examples, when identifying the customer, the payment service may compare the one or more preferences associated with the transaction with general information associated with customers that stored in the customer profiles. For instance, the payment service may determine that the item acquired during the transaction includes a type of item that females purchase more often than males. The payment service can then identify which of the customer profiles is associated with a female customer when identifying the customer that is conducting the transaction with the payment instrument.

After identifying a customer using the customer profiles, the payment service sends data representing the receipt to the contact information stored in the customer profile of the identified customer. In some examples, the payment service may add a link to the receipt that includes contact information for another customer that uses the payment instrument.

In such examples, the customer can use the link to send the receipt to the contact information of the other customer.

By generating the receipt at the payment service for the merchants, the payment service provides benefits for POS devices of the merchants. For instance, many POS devices used by merchants include limited resources, such as processing power and memory space. As such, by generating receipts at the payment service, such POS devices are not required to store large applications for generating receipts, which saves memory space. Additionally, the POS devices merely have to send the transaction data to the payment service (which POS devices do during normal use when authorizing payment instruments) in order to receive and print the receipts. This saves processing power, as again, the POS devices are not required to generate the receipts.

Additionally, merchants are able to update and/or customize receipts without updating and installing new hardware and/or software on POS devices. For instance, a merchant merely has to use a POS device to select a new template to use for transactions when the merchant wants to update and/or customize a receipt. This is beneficial for merchants that use multiple POS devices, either in one physical location or across two or more physical locations, when conducting transactions with customers.

For instance, by having the receipt logic stored at a payment service, each POS device that uses the payment service does not have to store its own receipt logic. As such, when a merchant includes multiple POS devices and wants to update a receipt, the merchant is not required to update the receipt logic on each of the POS devices. Rather, the merchant is only required to select a new template that is provided by the payment service. This saves computing resources (e.g., memory space) on the POS devices.

Moreover, using customer profiles to send receipts to customers provides benefits to electronic devices of the customers. For instance, the payment service sends data representing the receipts to customers that actually conducted transactions with merchants. Therefore, the payment service is not sending unnecessary data (e.g., emails, text messages, or the like) to electronic devices of customers that are not conducting the transactions. Such unnecessary data utilizes computing resources (e.g., processing power and/or network bandwidth) of both the payment service and the electronic devices of the customers.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 that includes merchants 102 that conduct transactions with customers 104 for items 106, as well as a payment service 108 to authorize payment instruments for the transactions. In this environment, the payment service receives data indicating selected templates 110 along with requests to authorize transactions 112 from merchant 102. The payment service 108 then generates receipts 114 for the transactions based on the selected templates 110, and sends the receipts 114 to either the merchants 102, the customers 104 that conducted the transactions with the merchants, or both.

As illustrated, individual ones of the customers 104 may engage in transactions with the merchants 102 to obtain items 106. The customers may provide, as shown at 116, cash or payment instruments to the merchants along with requests for items offered by the merchants. These requests may include requested customizations, such as a requested size, flavor, ingredients, preparation, or the like.

The merchants may utilize respective point-of-sale (POS) devices (see FIGS. 2, 5) for accepting payment from the customers 104. The POS devices may comprise any sort of mobile or non-mobile devices that include instances of a merchant application that executes on the respective devices. The merchant application may provide POS functionality to the POS device to enable the merchants 102 (e.g., owners, employees, etc.) to accept payments from the customers 104. In some types of businesses, the POS device may correspond to a store or other place of business of the merchant, and thus, may be a fixed location that typically does not change on a day-to-day basis. In other types of businesses, however, the location of the POS device may change from time to time, such as in the case that a merchant operates a food truck, is a street vendor, is a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between one of the customers 104 and one of the merchants 102. For example, when paying for a transaction, the customer can provide the amount that is due to the merchant using cash or other payment instrument (e.g., a debit card, a credit card, a stored-value or gift card, a check, through an electronic payment application on a device carried by the customer, or the like). The merchant can interact with the POS device to process the transactions, such as by inputting (e.g., manually, via a magnetic card reader or an RFID reader, etc.) identifiers associated with the payment instruments. For example, a payment instrument of the customer may include one or more magnetic strips for providing card and customer information when swiped in a card reader. In other examples, other types of payment cards may be used, such as smart cards having a built-in memory chip that is read by the device when the card is "dipped" into the reader, a radiofrequency identification tag, or so forth.

During the transaction, the POS device can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, a name of the customer, contact information of the customer, and so forth. The POS device can send the transaction information to the payment service 108 over a network 118, either substantially contemporaneously with the conducting of the transaction (in the case of online transactions) or later when the device is in the online mode (in the case offline transactions).

In an offline transaction, the POS device may store one or more characteristics associated with the transaction (i.e., the transaction information), such as a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with one of the customers 104, the POS device may provide the stored information (or some subset of it) to the payment service 108 over the network 118. The network 118 may represent any one or more wired or wireless networks, such as a WiFi network, a cellular network, or the like. In an online transaction, the POS device may send this information to the payment service 108 over the network 118 substantially contemporaneously with the transaction with the customer.

After the merchants 102 receive the payment information from the customers 104, the merchants may send respective authorization requests, along with information regarding the respective transactions, to the payment service 108, as illustrated at 112. The payment service 108 may include one or more processors 120 and memory 122, which may store a payment processing module 124, a mapping module 126, a receipt generation module 128, one or more merchant profiles 130, one or more customer profiles 132, receipt templates 134.

The payment processing module 124 may function to receive the information regarding a transaction from the POS device of a merchant and attempt to authorize the payment instrument used to conduct the transaction. The payment processing module 124 may then send an indication of whether the payment instrument has been approved or declined back to the POS device, as illustrated at 136.

Generally, when a customer and a merchant enter into an electronic payment transaction, the transaction is processed by electronically transferring funds from a financial account associated with the customer to a financial account associated with the merchant. As such, the payment processing module 124 may communicate with one or more computing devices of a card network (or "card payment network"), e.g., MasterCard®, VISA®, over the network 118 to conduct financial transactions electronically. The payment processing module 124 can also communicate with one or more computing devices of one or more banks, processing/acquiring services, or the like over the network 118. For example, the payment processing module 124 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In addition to attempting to authorize a payment instrument of a customer, the payment service 108 may identify, from the transaction data associated with a particular transaction, customer preferences 138 of the customer 138. For instance, preferences 138 identified within transaction data may include items acquired by the customer, preferences for customizing the acquired items, times of the transactions, locations of merchants that conduct the transactions, or the like. The mapping module 126 may map the payment instrument 140 of the customer to an identity of the customer (e.g., using a name on the instrument) and may store this information along with indications of the preferences 138 in a profile of the customer maintained in the customer profiles 132. While FIG. 1 illustrates the merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process. Again, in these instances the mapping module 126 may map the transactions, and the item preferences expressed therein, to the corresponding customer profiles.

The customer profiles 132 may further store data that indicates general information 142 associated with the customers 104. The general information 142 can include an identify (e.g., name) for a customer, an age of the customer, a gender of the customer, an education level of the customer, contact information (e.g., a phone number, email address, street address, etc.) of the customer, or the like. In some examples, as illustrated in FIG. 1, the payment service 108 receives the data indicating the general information 142 from the customers 104. For instance, the customers 104 may utilize respective electronic devices (see FIGS. 2, 5) to send the data indicating the general information 142 to the payment service 108. In some examples, the customers 104 send the data indicating the general information along with indications of the payment instruments 140 in order for the payment service 108 to associate the payment instruments 140 and the general information 142 with respective customer profiles 132. Additionally or alternatively, in some examples, the merchants 102 may send the data indicating the general information 142 to the payment service 108, such as along with the authorization requests and transaction data 112.

While the customer profiles 132 may store indications of customer preferences 138, payment instruments 140, and general information 142, the merchant profiles 130 may store information associated with respective ones of the merchants 102. For instance, the merchant profiles 130 may store data indicating selected templates 110 and merchant data 144. As will be discussed in further detail below, selected templates 110 include each of the receipt templates 134 selected by respective merchants. Merchant data 144 may indicate a class of items offered by respective merchants (e.g., coffee items, collectibles, apparel, etc.), a type of business of the merchant (e.g., restaurant, coffee shop, retail store, etc.), a geographical location of the merchant, and the like.

Also illustrated in the example of FIG. 1, the payment service 108 sends example receipt templates 146 to merchants 102. Example receipt templates 146 can include data corresponding to one or more of receipt templates 134 stored on payment service 108, where receipt templates 134 define receipts that merchants 102 can use when conducting transactions with customer 104. For instance, in some examples, an individual receipt template 134 defines one or more of a layout for a receipt, text to include in the receipt, or one or more graphics to include in the receipt. Merchants 102 can use respective POS devices to select templates from examples templates 146, as shown by 110 and illustrated in FIG. 2. The payment service 108 then associates the selected templates 110 with the respective merchant profiles 130 of the merchants 102. In some examples, associating the selected templates 110 with the respective merchant profiles 130 includes storing data indicating the selected templates 110 in the respective merchant profiles 130.

Figure 4:
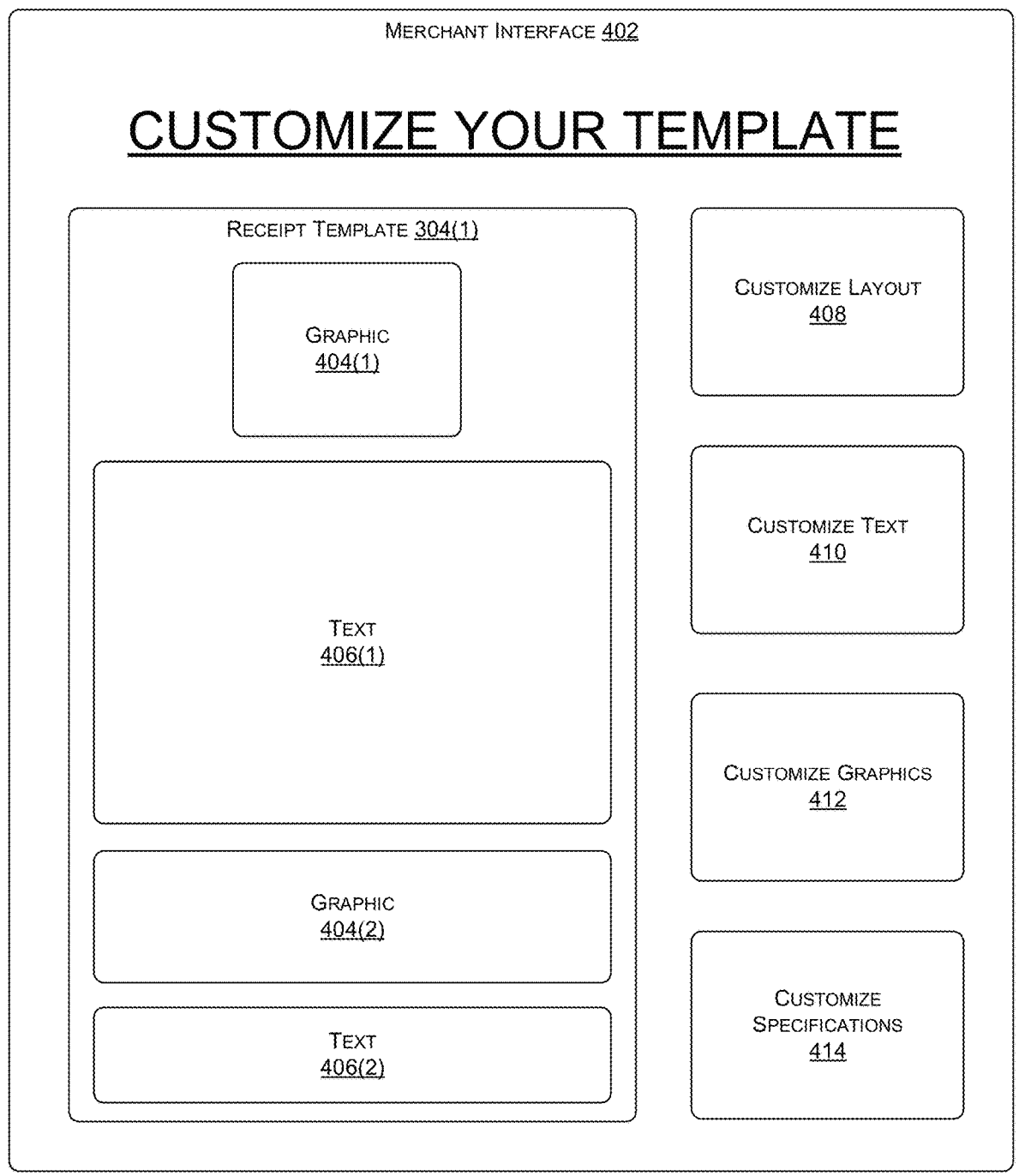
FIG. 4 illustrates an example user interface for customizing a selected receipt template. A POS device associated with a merchant may provide the user interface to the merchant.

Additionally or alternatively, in some examples, merchants 102 may further customize selected receipts using respective POS devices, as illustrated in FIG. 4. For instance, after selecting a template, the POS device may provide the merchant with options to change the layout of the receipt corresponding to the selected template, change the text included in the receipt, and/or change one or more graphics included in the receipt.

Additionally or alternatively, in some examples, merchants 102 can further specify when to use one or more selected templates 110. For instance, a merchant can associate one or more selected templates 110 with a type of items or services, a time period (e.g., time of day, time of year, etc.), a merchant location (e.g., if the merchant includes more than one geographic location), or the like. The payment service 108 can identify and use the one or more selected templates 110 for the merchant based on specifications set by the merchant.

In some examples, payment service 108 utilizes the selected templates 110 to generate receipts 114 for merchants 102 and/or customers 104. For instance, payment service 108 can utilize receipt generation module 128 to generate a receipt that is based on a selected template using transaction data that the payment service 108 receives from the merchant. When a merchant specifies when to use one or more of the selected templates 110, the payment service 108 can first identify and select a template to use for the receipt. For example, if the merchant specifies to use a first template for a first class of items and a second template for a second class of items, the payment service 108 can use the transaction data to identify a class of items that the customer is acquiring, such as items that correspond to the first class of items. The payment service 108 can then identify which selected template to use, such as the first template in the example, when generating a receipt for the transaction.

The payment service 108 can then send the merchant data representing the generated receipt so that the merchant can provide the receipt to a customer. In some examples, the merchant can utilize the POS device to print a physical copy of the generated receipt and provide the customer with the physical copy. Additionally or alternatively, in some examples, the merchant can utilize the POS device to send the generated receipt to an electronic device of the customer. In either of the examples, the POS device of the merchant merely has to send transaction data to the payment service 108, which the POS device performs in normal operation when authorizing transactions using the payment service 108, in order to provide receipts to customers. Therefore, the POS device is not required to generate receipts for customers, which, as discussed above, provides benefits to the POS device.

Additionally or alternatively, the payment service 108 can provide data representing receipts 114 to customers 104 using the general information 142 stored in the customer profiles 132. For instance, the payment service 108 can use transaction information received from a merchant to determine a customer that is associated with the transaction. For example, the payment service 108 can identify one or more preferences from the transaction information, such as a payment instrument used by a customer, a type of item acquired by a merchant, a time of the transaction, a location of the transaction, etc. The payment service 108 can then compare the one or more preferences with customer profiles 132 to determine a customer that is associated with the transaction.

For instance, the payment service 108 can determine that a specific customer is associated with the transaction based on matching the payment instrument used by the customer to an identifier of a payment instrument stored in one of customer profiles 132. If more than one of the customer profiles 132 includes the identifier of the payment instrument, the payment service 108 can use additional preferences from the transaction information to determine which customer is associated with the transaction. For instance, the payment service can compare at least one of the type of item, the time of the transaction, or the location of the merchant associated with the transaction with the preferences 138 (e.g., items acquired, time of transactions, locations of merchants that conducted transactions) of each of the customer profiles 132 that includes the identifier of the payment instrument. The payment service 108 can then determine which customer is associated with the transaction based on the comparing.

For instance, the payment service 108 can determine which of the customer profiles 132 includes the most similarities with the preferences identified for the transaction. In some examples, the payment service can give weight to one or more of the preferences 138 when making the determination. For instance, the payment service 108 can provide more weight to the location and time preferences than the type of item preferences. The payment service 108 can then determine which customer to send the receipt to based on the customer profile for the customer including the greatest amount of similarities.

It should be noted that, in some examples, the payment service 108 may determine to send the receipt to the customer that includes the customer profile that has the least amount of similarities as the one or more identified preferences from the transaction. For instance, the payment service 108 may determine that the item acquired in the transaction includes an item that customers usually acquire as a gift. In response, the payment service can determine that a first customer associated with a first customer profile that includes the identifier of the payment instrument is buying the gift for a second customer associated with a second customer profile that includes the identifier of the payment instrument. For example, even if the second customer profile includes the most similarities to the one or more preferences identified for the transaction, the payment service 108 may send the receipt to the first customer.

It should further be noted that the payment service 108 can use geographic locations 148 of customers 104 when determining which customer to send a receipt to. For instance, at the time of a transaction, the payment service 108 can request and receive a geographic location 148 of an electronic device of a customer. The geographic location of the electronic device can be determined using a Global Positioning System of the electronic device, or using some other position determining technology. The payment service 108 can then receive an indication of the geographic location of the electronic device and compare the geographic location of the electronic device to a geographic location of a merchant.

In some example, based on the comparing, the payment service 108 can determine whether the customer is within a threshold distance of the geographic location of the merchant. For instance, the payment service can determine whether the customer is within a given radius of a geographic location of the merchant. Based on a determination that the customer is within the threshold distance of the geographic location of the merchant, the payment service can determine that the customer is conducting the transaction with the merchant.

For example, if a first electronic device of a first customer that is associated with a first customer profile that includes the identifier of the payment instrument is within a threshold distance of the merchant, and a second electronic device of a second customer that is associated with a second customer profile that includes the identifier of the payment instrument is not within the threshold distance, then the payment service 108 can determine that the first customer is conducting a transaction with the merchant. In some examples, the payment service 108 requests geographic locations from the first and second electronic devices in response to the payment service receiving transaction information from a merchant that includes the identifier of the payment instrument.

Additionally, it should be noted that, in some examples, the payment service 108 can further use the general information 142 about the customers 104 when determining which customer is conducting the transaction. For instance, the payment service 108 may identify the preferences associated with a transaction. As discussed above, the preferences may include types of items acquired during the transaction, a time of the transaction, and a location of the transaction. The payment service 108 can then compare the preferences of the transaction with the general information 142 stored in the customer profiles 132 in order to determine which of the customers is conducting the transaction with the merchant.

For example, if the type of item is associated with a female product, then the payment service 108 may determine that a female customer is conducting the transaction with the merchant. The payment service may then identify a customer profile that is associated with a female customer and includes an identifier for the payment instrument being used in the transaction. For another example, if the type of item includes a video game for teens, then the payment service 108 may determine that a teenage customer is conducting the transaction with the customer. The payment service may then identify a customer profile that is associated with a teenage customer and includes an identifier for the payment instrument being used in the transaction. As such, the payment service 108 can determine which customer conducted the transaction with a merchant based on both previous transactions associated with the customer and/or general information about the customer.

Figure 2:
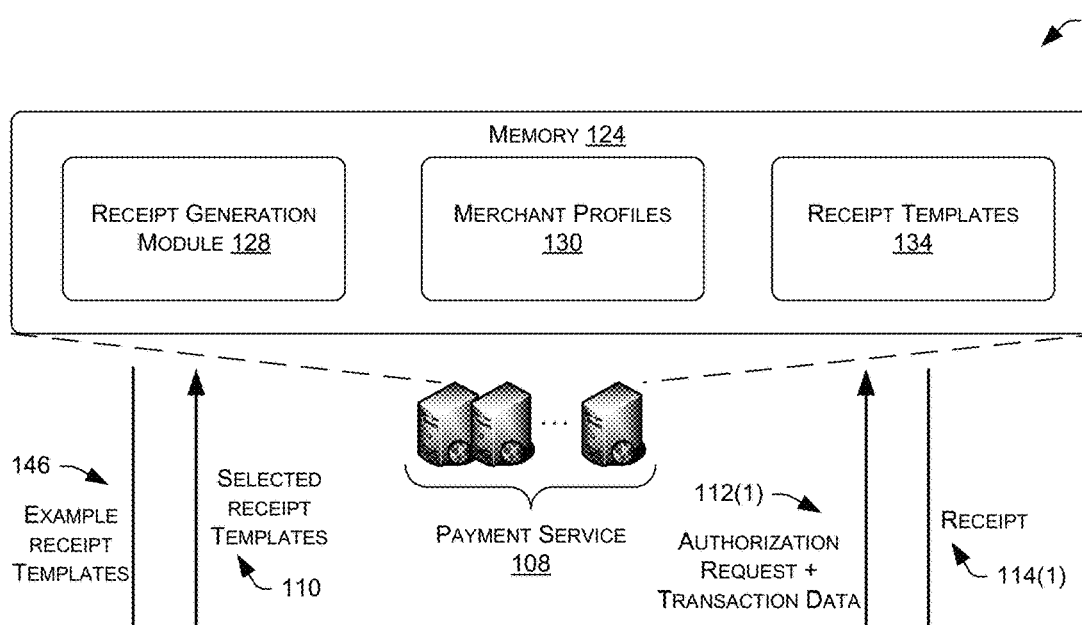
FIG. 2 illustrates an example scenario of a payment service providing a merchant with receipt templates and receiving at least one selected receipt template from the merchant in response. The payment service uses one of the selected receipt templates to generate a receipt for a transaction between the merchant and a customer, and then sends data representing with the receipt to the merchant.
Figure 2:
Figure 2:
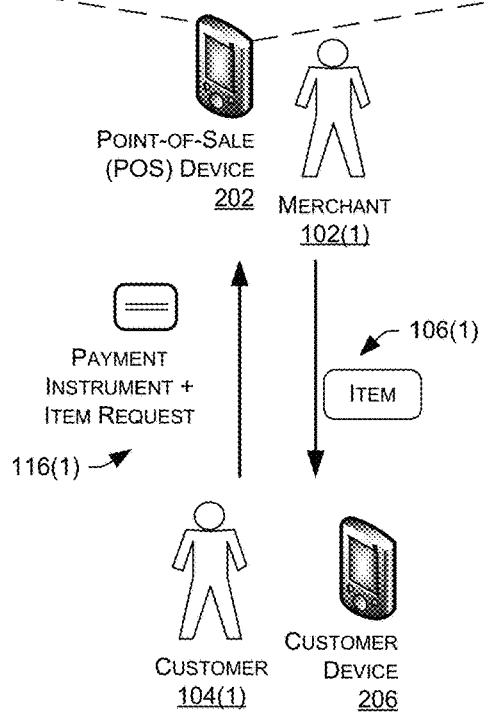

FIG. 2 illustrates an example scenario 200 of a payment service 108 providing a merchant 102(1) with example receipt templates 146 and receiving at least one selected receipt template 110 from the merchant 102(1) in response. The payment service 108 uses one of the selected receipt templates 110 to generate a receipt 114(1) for a transaction between the merchant 102(1) and a customer 104(1), and then sends data representing with the receipt 114(1) to the merchant 102(1).

In the example of FIG. 2, the payment service 108 provides data representing the example templates 146 to a point-of-sale (POS) device 202 associated with the merchant 102(1). After receiving the data representing the example receipt templates 146, a merchant application 204 running on the POS device 202 can provide a user interface that includes the example receipt templates 146, which is illustrated in FIG. 3. The merchant 102(1) can use the POS device 202 to select one or more of the example receipt templates 146 via the user interface. Additionally, in some examples, the merchant 102(1) can further customize respective receipts that are defined by the one or more selected receipt templates, which is illustrated in FIG. 4. For instance, the merchant 102(1) can customize a layout associated a receipt, text included in the receipt, one or more graphics included in the receipt, or the like.

The merchant 102(1) uses the POS device 202 to send data representing the selected receipt templates 110 back to the payment service 108, which the payment service can store in a merchant profile (one of merchant profiles 130) associated with the merchant 102(1). In some examples, the payment service 108 can further receive data indicating when to use one or more of the selected receipt templates 110 from the POS device 202, and store that data in the merchant profile. For instance, the indications can specify that the payment service 108 use a specific one of the selected receipt templates 110 based on a type of item acquired by the customer 104(1), a time of a transaction with the customer 104(1), a geographic location of the merchant 102(1) (if the merchant 102(1) includes more than one geographic location), or the like.

Also illustrated in the example of FIG. 2, the customer 104(1) conducts a transaction with the merchant 102(1). For instance, the customer 104(1) provides a payment instrument and item request 116(1) to the merchant 102(1) and receives an item 106(1) from the merchant 102(1) in response. The POS device 202 of the merchant 102(1) then sends an authorization request and transaction data 112(1) associated with the transaction to the payment service 108.

Based on receiving the authorization request and transaction data 112(1) form the POS device 202, the payment service 108 selects one of the selected receipt templates 110 from the merchant profile of the merchant 102(1). In some examples, the payment service 108 uses an identity of the merchant 102(1) in order to select the receipt template. In some examples, when the selected receipt templates 110 include more than one receipt template, the payment service 108 may use additional criteria to select a receipt template. For instance, and based on the indications received from the merchant 102(1) (discussed above), the payment service 108 can select the receipt template based on information identified within the transaction data. For instance, the payment service 108 can select the receipt template based on a type of item acquired by the customer 104(1), a time of the transaction, a location of the merchant 102(1) (if the merchant 102(1) includes more than one merchant location), or the like.

In some examples, the payment service 108 can use the selected receipt template to generate a receipt 114(1) for the transaction. The payment service 108 can then send data representing the receipt 114(1) to the POS device 202 of the merchant 102(1). In some examples, the merchant 102(1) uses the POS device 202 to print a physical copy of the receipt 114(1), such as with a peripheral device (e.g., printer) of the POS device 202, and provides the physical copy of the receipt 114(1) to the customer 104(1). Additionally or alternatively, in some examples, the merchant 102(1) uses the POS device 202 to send a digital copy of the receipt 114(1) to a customer device 206 associated with the customer 104(1).

It should be noted that, in some examples, the payment service may further add additional content to the receipt 114(1) before sending the data representing the receipt 114(1) to the POS device 202. The additional data can include advertisements, promotions, recommendations for items, or the like. In some examples, the payment service 108 generates the additional content using the transaction data. For instance, the payment service 108 may identify a customer profile associated with the customer 104(1) using the transaction data. The payment service can then generate additional content that is directed to the customer 104(1) based on information stored in the customer profile. Additionally or alternatively, in some examples, the payment service 108 generates additional content based on a merchant profile associated with the merchant 102(1). For instance, the payment service 108 can generate the additional content based on previous transactions conducted by the merchant 102(1) with customers.

In some examples, the payment service 108 can receipt feedback corresponding to the additional content. The feedback can include whether the customer 104(1) utilized the additional content, such as purchased an item in an advertisement or promotion, or purchased the recommended item. For instance, payment service 108 can receive an additional authorization request and transaction information from the POS device 202 that corresponds to an additional transaction between the merchant 102(1) and the customer 104(1). The payment service 108 may identify, from the additional transaction information, that the customer 103(1) acquired an item associated with the additional content from the merchant 102(1).

In some examples, the payment service 108 can use feedback corresponding to additional content when determining which additional content to add to receipts. For instance, the payment service 108 can continue to add a specific advertisement for an item to receipts based on customers purchasing the item after receiving a receipt that includes the advertisement.

It should further be noted that, in some examples, the payment service 108 may further send data representing the receipt 114(1) to the customer device 206 of the customer 104(1). For instance, the payment service 108 may identify the customer 104(1) based on the transaction data using a customer profile of the customer 104(1). The payment service 108 can then send the data representing the receipt 114(1) to the customer device 206 using contact information that is stored in the customer profile, which is discussed with regard to FIG. 5.

FIG. 3 illustrates an example user interface 302 for selecting one or more receipt templates 304(1)-(6) (which may represent example receipt templates 146). A POS device associated with a merchant, such as the POS device 202 associated with the merchant 102(1), may provide the user interface 302 to the merchant.

For instance, and using the example scenario 200 from FIG. 2, the payment service 108 may send the data representing the example receipt templates 146 to the POS device 202 of the merchant 102(1). The merchant application 204 executing on the POS device 202 may cause the POS device 202 to provide the user interface 302 to the merchant 102(1). In some examples, providing the user interface 302 to the merchant 102(1) includes displaying the user interface 302 using a display associated with the POS device 202.

In the example FIG. 3, the user interface 302 includes six different receipt templates 304(1)-(6). However, in other examples, the user interface 302 can include more or less receipt templates. Each of the receipt templates 304(1)-(6) of FIG. 2 can define a respective receipt for selection by the merchant 102(1). For instance, each of the receipt templates 304(1)-(6) can define visual characteristics that the payment system 108 uses when generating the receipt 114(1). The visual characteristics can include one or more of a visual layout of the receipt 114(1), text included in the receipt 114(1), one or more graphical objects included in the receipt 114(1), or the like.

In some examples, the POS device 202 can receive input corresponding to a selection of one or more of the receipt templates 304(1)-(6) via the user interface 302. For instance, in some examples, the input can include a touch input from the merchant 102(1) when the POS device 202 includes a touch-sensitive display. Additionally or alternatively, the merchant 102(1) can use a peripheral device (e.g., buttons, a joystick, a keyboard, a keypad, etc.) associated with the POS device 202 to provide the input. Based on the input, the POS device 202 can send the data indicating the selected receipt templates 110 to the payment service 108.

FIG. 4 illustrates an example user interface 402, which may correspond to user interface 302, for customizing a selected receipt template 304(1). A POS device associated with a merchant, such as the POS device 202 associated with the merchant 102(1), may provide the user interface 402 to the merchant 102(1). In some examples, providing the user interface 402 to the merchant 102(1) includes displaying the user interface 402 using a display associated with the POS device 202.

In some examples, the receipt template 304(1) that the merchant 102(1) selects defines a layout for a respective receipt. For instance, in the example of FIG. 4, the receipt corresponding to the receipt template 304(1) includes a first custom graphic 404(1) at a top of the receipt, first text 406(1) below the first customer graphic 404(1), a second custom graphic 404(2) below the first text 406(1), and then second text 406(2) below the second custom graphic 404(2). In some examples, each of the other receipt templates 304(2)-(6) may define a different layout for a respective receipt.

The user interface 402 also includes options for further customizing the selected receipt template 304(1). For instance, the user interface 402 includes a custom layout 408 option, a custom text 410 option, a custom graphics 412 option, and a custom specifications 414 option. However, in other examples, the user interface 402 may include more or less options for customizing the receipt template 304(1).

The custom layout 408 option provides the merchant 102(1) with functionality for changing the layout of the receipt defined by the receipt template 304(1). For instance, the merchant 102(1) can use the custom layout 408 option to rearrange one or more of the graphics 404 or text 406 fields included in the receipt. Additionally, the merchant 102(1) can use the custom layout 408 option to add new graphics 404 or text 406 fields to the receipt, or remove one or more of the graphics 404 or text 406 fields from the receipt.

The custom text 410 option provides the merchant 102(1) with functionality for changing text that is included in the text 406 fields of the receipt. For instance, the merchant 102(1) can use the custom text 410 option to add or delete text from the text 406 fields, or revise text that is currently in the text 406 fields.

The custom graphics 412 option provides the merchant 102(1) with functionality for changing one or more graphics included in the graphics 404 fields of the receipt. For instance, the merchant 102(1) can use the custom graphics 412 option to add or delete graphics to the graphics 404 fields, or revise graphics that are currently in the graphics 404 fields.

The custom specifications 414 option provides the merchant 102(1) with functionality for indicating when the payment service 108 should use the receipt template 304(1) to generate receipts for transactions. For instance, the merchant 102(1) can utilize the custom specifications 414 field to indicate that the payment service 108 use the receipt template 304(1) when a transaction includes a specific type of item, occurs at a specific time period (e.g., time of day, time of year, etc.), occurs at a specific location (if the merchant includes more than one physical location), or the like. In some examples, as discussed above, the payment service 108 thus compares transaction data received from the merchant 102(1) with custom specifications 414 for receipt templates in order to identify and select a receipt template for the transaction.

Figure 5:
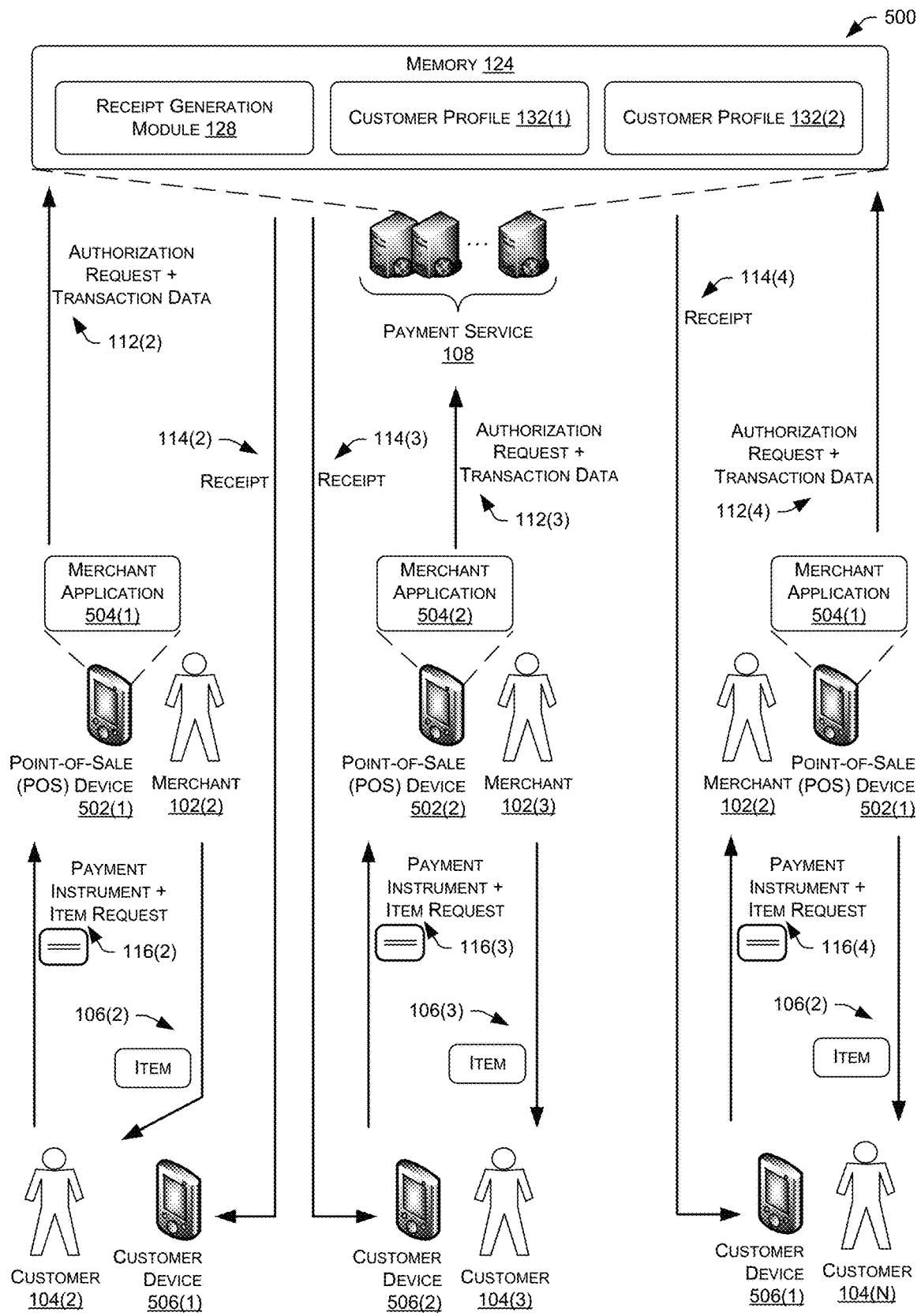
FIG. 5 illustrates an example scenario of two customers using a payment instrument to conduct transactions with merchants. The payment service may generate a customer profile for each customer when authorizing the payment instrument for the respective customer. The payment service may further uses the customer profiles when determining which customer to send receipts to for transactions.

FIG. 5 illustrates an example scenario 500 of two customers 104(2)-(3) using a payment instrument to conduct transactions with merchants 102(2)-(3). The payment service 108 may generate a customer profiles 132(1)-(2) for each of the customers 104(2)-(3), respectively, when authorizing the payment instrument for the customers 104(2)-(3). The payment service 108 may further use the customer profiles 132(1)-(2) when determining which of the customers 104(2)-(3) to send receipts 114(2)-(4) to for transactions.

In the example 500 of FIG. 5, a first customer 104(2) may conduct a transaction with a first merchant 102(2) at a first time period. For instance, the first customer 104(2) provides a first payment instrument and item request 116(2) to the first merchant 102(2) and receives a first item 106(2) from the first merchant 102(2) in response. A first POS device 502(1) of the first merchant 102(2) then uses a first merchant application 504(1) to send a first authorization request and transaction data 112(2) associated with the transaction to the payment service 108.

Based on receiving the first authorization request and transaction data 112(2) from the first POS device 502(1), the payment service 108 can generate a first customer profile 132(1) for the first customer 104(2). The payment service 108 can also use the first authorization request and transaction data 112(2) to identify general information for the first customer 104(2), an identifier for the payment instrument, and preferences of the first customer 104(2). The preferences of the first customer 104(2) can include the first item 106(2) acquired by the first customer 104(2) during the transaction (e.g., coffee), any preferences the first customer 104(2) requests for the first item 106(2) (e.g., extra-hot coffee), a time of the transaction, a location of the transaction (e.g., location of the first merchant 102(2)), or the like.

In some examples, the payment service 108 then associates the identifier of the payment instrument with the first customer profile 132(1). For instance, the payment service 108 may store the identifier of the payment instrument in the first customer profile 132(1). The payment service 108 may further store the general information for the first customer 104(2) and data indicating the preferences of the first customer 104(2) in the first customer profile 132(1).

In the example of FIG. 5, the payment service 108 further generates a first receipt 114(2) for the transaction using the first authorization request and transaction data 112(2). In some examples, the payment service 108 generates the first receipt 114(2) using a receipt template selected by the first merchant 102(2). The payment service 108 then sends data representing the first receipt 114(2) to the contact information for the first customer 104(2). For instance, the payment service 108 can email the first receipt 114(2) to the first customer 104(2) using the email address of the first customer 104(2). The first customer 104(2) can then use his or her first customer device 506(1) to receive and view the first receipt 114(2).

Also illustrated in FIG. 5, a second customer 104(3) may conduct a transaction with a second merchant 102(3) at a second time period. For instance, the second customer 104(3) provides a second payment instrument and item request 116(3) to the second merchant 102(3) and receives a second item 106(3) from the second merchant 102(3) in response. A second POS device 502(2) of the second merchant 102(3) then uses a second merchant application 504(2) to send a second authorization request and transaction data 112(3) associated with the transaction to the payment service 108.

Based on receiving the second authorization request and transaction data 112(3) from the second POS device 502(2), the payment service 108 can generate a second customer profile 132(2) for the second customer 104(3). The payment service 108 can also use the second authorization request and transaction data 112(3) to identify general information for the second customer 104(3), an identifier for the payment instrument, and preferences of the second customer 104(3). The preferences of the second customer 104(3) can include the second item 106(3) acquired by the second customer 104(3) during the transaction (e.g., a bagel), any preferences the second customer 104(3) requests for the second item 106(3) (e.g., cheese on the bagel), a time of the transaction, a location of the transaction (e.g., location of the second merchant 102(3)), or the like.

In some examples, the payment service 108 then associates the identifier of the payment instrument with the second customer profile 132(2). For instance, the payment service 108 may store an identifier of the payment instrument in the second customer profile 132(2). The payment service 108 may further store the general information of the second customer 104(3) and data indicating the preferences of the second customer 104(3) in the second customer profile 132(2).

In the example of FIG. 5, the payment service 108 further generates a second receipt 114(3) for the transaction using the second authorization request and transaction data 112(3). In some examples, the payment service 108 generates the second receipt 114(3) using a receipt template selected by the second merchant 102(3). The payment service 108 then sends the second receipt 114(3) to the contact information for the second customer 104(3). For instance, the payment service 108 can email the second receipt 114(3) to the second customer 104(3) using the email address of the second customer 104(3). The second customer 104(3) can then use his or her second customer device 506(2) to receive and view the second receipt 114(3).

In some examples, two or more customers may use the same payment instrument. For instance, in the example of FIG. 5, the first payment instrument and item request 116(2) of the first customer 104(2) includes the similar (e.g., matching) identifier for a payment instrument as the second payment instrument and item request 116(3) of the second customer 104(3). In some examples, the first customer 104(2) and the second customer 104(3) can use the same physical payment instrument. In some examples, the first customer 104(2) may use a first physical payment instrument and the second customer 104(3) may use a second physical payment instrument, wherein the first and second physical payment instruments include the same payment instrument identifier (e.g., account number). In either of the examples, the payment service associates both the first customer profile 132(1) of the first customer 102(2) and the second customer profile 132(2) of the second customer 102(3) with the same payment instrument.

Also illustrated in FIG. 5, an unknown customer 104(N) may conduct a transaction with the first merchant 102(2) at a third, later time period than the first and second time periods. For instance, the unknown customer 104(N) provides a third payment instrument and item request 116(4) to the first merchant 102(2) and receives the first item 106(2) from the first merchant 102(2) in response. A first POS device 502(1) of the first merchant 102(2) then uses a first merchant application 504(1) to send a third authorization request and transaction data 112(4) associated with the transaction to the payment service 108.

In the example of FIG. 5, the unknown customer 104(N) may be unknown since the third authorization request and transaction data 112(4) does not include identity information and/or contact information for the unknown customer 104(N). Additionally, the payment service 108 may determine that the third authorization request and transaction data 112(4) includes an identifier for the same payment instrument as the first authorization request and transaction data 112(2) and the second authorization request and transaction data 112(3). The payment service 108 can then compare the identifier of the payment instrument with customer profiles 132 (from FIG. 1) in order to identify that the first customer profile 132(1) and the second customer profile 132(2) are associated with the payment instrument. Thus, the payment service 108 can determine that the unknown customer 104(N) can include the first customer 104(2) or the second customer 104(3).

In some examples, the payment service uses the third authorization request and transaction data 112(4) to identify preferences of the unknown customer 104(N). The preferences of the unknown customer 104(N) can include the first item 106(2) acquired by the unknown customer 104(N) during the transaction (e.g., coffee), any preferences the unknown customer 104(N) requests for the first item 106(2) (e.g., extra-hot coffee), a time of the transaction, a location of the transaction (e.g., location of the first merchant 102(2)), or the like.

In some examples, the payment service 108 then compares the preferences of the unknown customer 104(N) with preferences the first customer 104(2) stored in the first customer profile 132(1) and preferences of the second customer 104(3) stored in the second customer profile 132(2). For instance, the payment service 108 may try to identify similarities between the preferences of the unknown customer 104(N) with preferences of the first customer 104(2) stored in the first customer profile 132(1) and preferences of the second customer 104(3) stored in the second customer profile 132(2). In the example of FIG. 5, the payment service 108 can identify that the unknown customer 104(N) and the first customer 104(2) both acquired the first item 106(2) (e.g., coffee), both included a similar preference request for the first item 106(2) (e.g., extra-hot coffee), both acquired the first item 106(2) at a similar time of day from the first merchant 102(2), and both acquired the first item 106(2) from the first merchant 102(2).

Based on determining that the preferences of the unknown customer 104(N) are most similar to the first customer 104(2), the payment service can identify the unknown customer 104(N) as the first customer 104(2). In response, the payment service 108 can generate a third receipt 114(4) using the third authorization request and transaction data 112(4). The payment service 108 can then use the contact information for the first customer 104(2) that is stored in the first customer profile 132(1) to send the third receipt 114(4) to the first customer 104(2) (i.e., the unknown customer 104(N)). For instance, the payment service 108 can email the third receipt 114(4) to the first customer 104(2) using the email address of the first customer 104(2). The first customer 104(2) can then use his or her first customer device 506(1) to receive and view the third receipt 114(4).

In some examples, the payment service 108 can further associate the preferences identified in the third authorization request and transaction data 112(4) with the first customer profile 132(1). For instance, since the payment service 108 identified the unknown customer 104(N) as the first customer 104(2), the payment service 108 can determine that the preferences identified in the third authorization request and transaction data 112(4) are for the first customer 104(2). As such, the payment service 108 associates the preferences identified in the third authorization request and transaction data 112(4) with the first customer profile 132(1) of the first customer 104(2).

It should be noted that, in some examples, the payment service 108 can further use general information of the first customer 104(2) stored in the first customer profile 132(1) and general information of the second customer 104(3) stored in the second customer profile 132(2) to identify the unknown customer 104(N). For instance, the payment service 108 may identify that females usually acquire the first item 106(2) acquired by the unknown customer 104(N). The payment service 108 may further identify that the first customer 104(2) is a female from the general information stored in the first customer profile 132(1) and that the second customer 104(3) is a male from the general information stored in the second customer profile 132(2). As such, the payment service 108 can determine that the unknown customer 104(N) is the first customer 104(2) since the first customer 104(2) is female. In some examples, the payment service 108 can make similar determinations based on age, education level, or the like of customers.

It should further be noted that, in some examples, the first authorization request and transaction data 112(2) and the second authorization request and data 112(3) may not include identity information and/or contact information for the first customer 104(2) and the second customer 104(3), respectively. For instance, in some examples, the first customer 104(2) and the second customer 104(3) may each directly provide the general information and the identifier of the payment instrument to the payment service 108. The payment service can then generate the first customer profile 132(1) and the second customer profile 132(2) for the first customer 104(2) and the second customer 104(2), respectively, and associated the identifier of the payment instrument with each of the customer profiles 132(1)-(2). The payment service 108 can then store the general information for the first customer 104(2) in the first customer profile 132(1) and store the general information for the second customer 104(3) in the second customer profile 132(2).

It should further be noted that, in some examples, the payment service 108 can use a geographical location of the first customer device 506(1) of the first customer 104(2) (i.e., the unknown customer 104(N) conducting the third transaction with the first merchant 102(2)) when identifying that the unknown customer 104(N) is the first customer 104(2).

For instance, the payment service 108 may send, at a time of the third transaction, a request for a current geographical location to each of the first customer device 506(1) and the second customer device 506(2). In response, the payment service 108 may receive an indication of the current geographical location of the first customer device 506(1) and an indication of the current geographical location of the second customer device 506(2) from the first customer device 506(1) and the second customer device 506(2), respectively. The payment service 108 can then compare the geographical locations to a geographical location associated with the first merchant 102(2) (such as a geographical location of the first POS device 502(1)) in order to determine if the first customer device 506(1) and/or the second customer device 506(2) is within a threshold distance of the geographical location of the first merchant 102(2).

In some examples, the threshold distance can include a radius around the geographical location of the first merchant 102(2). For instance, the threshold distance can include a number of feet, meters, yards, or miles around the geographical location of the first merchant 102(2). The payment service 108 can then use the determination when identifying whether the unknown customer 104(N) includes the first customer 104(2) or the second customer 104(3). For instance, if the payment service 108 determines that the first customer device 506(1) is within the threshold distance, then the payment service 108 may further use that determination to identify that the unknown customer 104(N) includes the first customer 104(2).

Additionally, it should be noted that, in some examples, the payment service 108 can determine that a customer is fraudulent using the first customer profile 132(1) and the second customer profile 132(2). For instance, the payment service 108 may receive an additional authorization request and transaction data from a merchant. The payment service 108 can identify that the additional authorization request and transaction data includes the identifier for the payment instrument. Additionally, the payment service 108 can identify preferences associated with the additional request authorization request and transaction data.

The payment service 108 can then compare the preferences associated with the additional authorization request and transaction data with preferences of the first customer 104(2) that are associated with the first customer profile 132(1) and preferences of the second customer 104(3) that are associated with the second customer profile 132(2). For instance, the payment service 108 may try to identify similarities between the preferences associated with the additional request and the preferences of the first customer 104(2) that are associated with the first customer profile 132(1). The payment service 108 can further try to identify similarities between the preferences associated with the additional request and the preferences of the second customer 104(3) that are associated with the second customer profile 132(2).

In some examples, based on the comparing, the payment service 108 may determine that the additional request is not associated with the first customer 104(2) or the second customer 104(3). For instance, in some examples, the payment service 108 may determine that there are no similarities between the preferences associated with the additional request and preferences that are associated with the first customer profile 132(1) or the second customer profile 132(2). In some examples, the payment service 108 may determine that there are less than a threshold number of similarities between the preferences associated with the additional request and preferences that are associated with the first customer profile 132(1) or second customer profile 132(2). For instance, the payment service may determine that only one of the type of item in the additional request, the time of the additional request, or the location of the additional request is similar to preferences that are associated with the first customer profile 132(1) or the second customer profile 132(2), even though a minimum of two preferences must be similar to meet the threshold.

In response, the payment service 108 can generate an alert that the additional request if fraudulent. The payment service 108 can then send the alert to the contact information stored in the first customer profile 132(1) and/or the contact information stored in the second customer profile 132(2). Additionally or alternatively, the payment service 108 can further send the alert to the first POS device 502(1) of the first merchant 102(2).

Figure 6A:
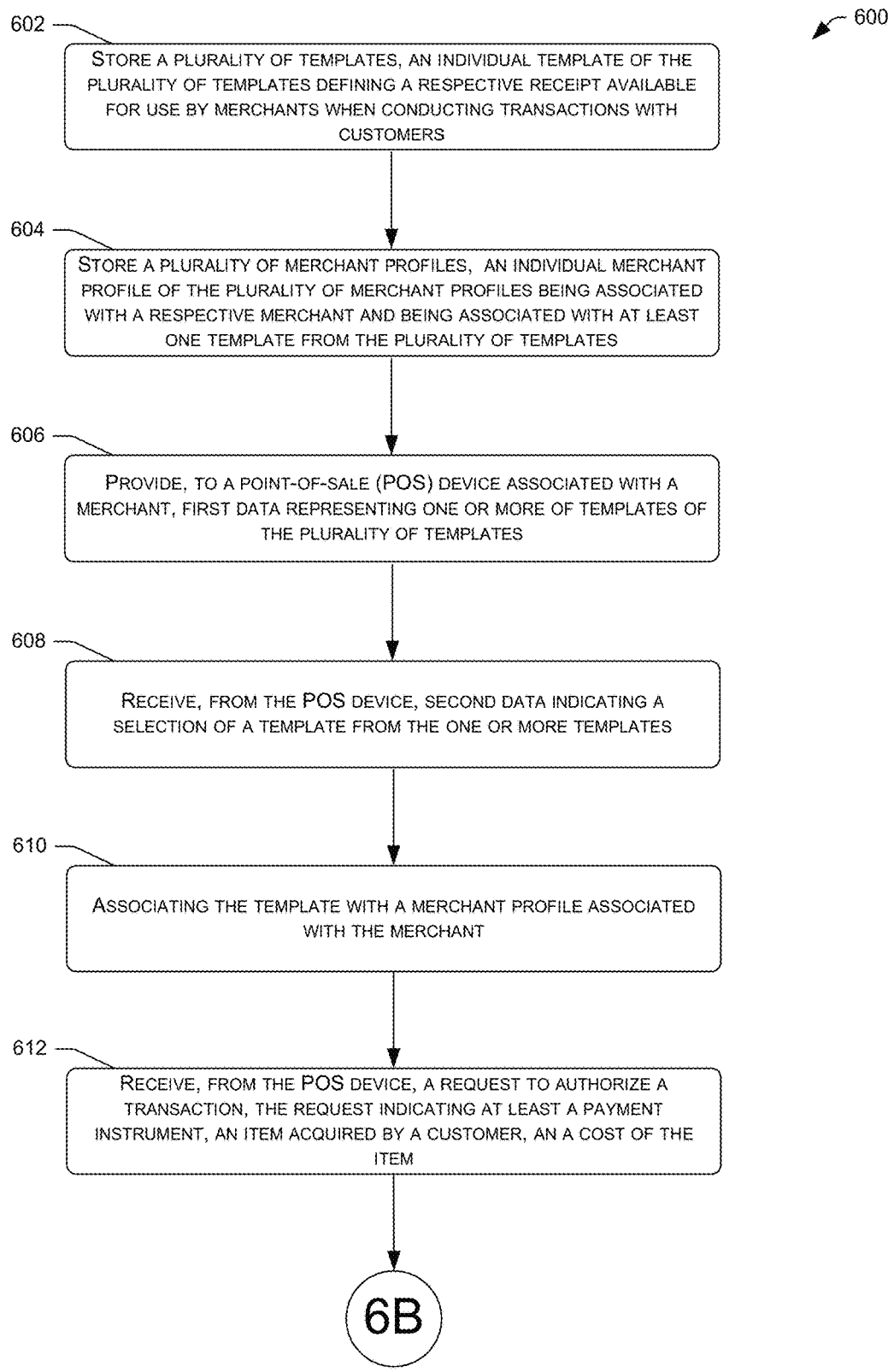
FIGS. 6A-6B illustrate a flow diagram of an example process for providing a merchant with receipt templates and then receiving a selected receipt template from the merchant. The example process further includes generating a receipt using the selected receipt template and sending data representing the receipt to the merchant.
Figure 6B:
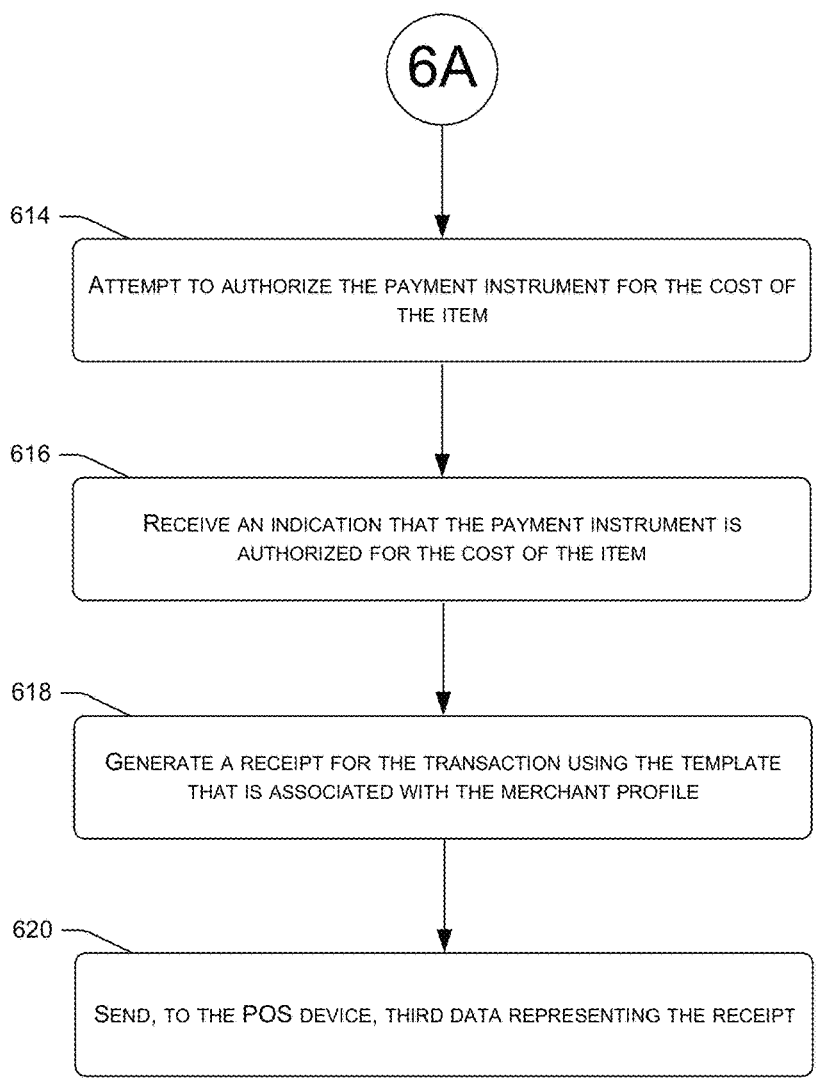

FIGS. 6A-6B illustrate a flow diagram of an example process 600 for providing a merchant with receipt templates and then receiving a selected receipt template from the merchant. The example process 600 further includes generating a receipt using the selected receipt template and sending data representing the receipt to the merchant. The process 600 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 300, and other processes described herein, may be performed by a payment service 108, by a merchant device (e.g., POS devices 202, 502(1), and/or 502(3)) by a customer device (e.g., customer devices 206, 506(1), and/or 506(2)), by another electronic device, by another entity, or by a combination thereof.

At 602, the process 600 stores a plurality of templates, an individual template of the plurality of templates defining a respective receipt available for use by merchants when conducting transactions with customers. For instance, a payment service can store a plurality of templates in a database. In some examples, each of the templates can define a respective receipt that is available for merchants when conducting transactions with customers. For instance, each template may define a layout of a respective receipt, text included in the respective receipt, and one or more graphics included in the respective receipt. In some examples, one or more of the templates can further allow a merchant to customize the receipt defined by the respective template. For instance, a merchant can customize the layout, the text, or the one or more graphics included in the receipt.

At 604, the process 600 stores a plurality of merchant profiles, an individual merchant profile of the plurality of merchant profiles being associated with a respective merchant and being associated with at least one template from the plurality of templates. For instance, the payment service can store the plurality of merchant profiles in a database, where each merchant profile is associated with a respective merchant and includes a template that the respective merchant selected for generating receipts.

At 606, the process 600 provides, to a POS device associated with a merchant, first data representing one or more templates of the plurality of templates and at 608, the process 600 receives, from the POS device, second data indicating a selection of a template from the one or more templates. For instance, the payment service may send (i.e., transmit) data representing one or more of the templates to the POS device. In response, the payment service may receive data indicating a selection of a template for the merchant.

In some examples, the payment service may further receive data indicating one or more additional templates selected by the merchant and/or one or more specifications that define when the use the templates selected by the merchant. For instance, a merchant may specify to use a specific template based on a type of item acquired by a customer, a time of a transaction, a location of the transaction, an identity of the customer, or the like.

At 610, the process 600 associates the template with a merchant profile associated with the merchant. For instance, the payment service may generate a merchant profile for the merchant. The payment service may then associate the selected template with the merchant profile.

At 612, the process 600 receives, from the POS device, a request to authorize a transaction, the request indicating at least an identifier for a payment instrument, an item acquired by a customer, and a cost of the item. For instance, a payment service may receive a request to authorize a transaction from the POS device. In some examples, the request may identify an identifier for a payment instrument, an item acquired by the customer, and a cost of the item.

At 614, the process 600 attempts to authorize the payment instrument for the cost of the item and at 616, the process 600 receives an indication that the payment instrument is authorized for the cost of the item. For instance, the payment service may communicate with one or more computing devices of one or more banks, processing/acquiring services, or the like to authorize the payment instrument for the cost of the item. The payment service may then receive an indication from the one or more computing devices of one or more banks, processing/acquiring services, or the like that the payment instrument is authorized for the cost of the item.

At 618, the process 600 generates a receipt for the transaction using the template that is associated with the merchant profile and at 620, the process 600 sends, to the POS device, third data representing the receipt. For instance, the payment service may generate the receipt for the transaction using the receipt template associated with the merchant profile. In some examples, the payment service may generate the receipt to include the layout, text, and one or more graphics as defined in the template. Additionally or alternatively, in some examples, payment service may further generate the receipt to include a custom layout selected by the merchant, custom text selected by the merchant, and/or one or more custom graphics selected by the merchant. For instance, the receipt can include information corresponding to the payment instrument, a description of the item, and a cost of the item. The payment service can then send data representing the receipt to the POS device of the merchant.

Additionally or alternatively, in some examples, the payment service may send data representing the receipt to an electronic device of the customer. For instance, the payment service may identify the customer from the request and send the data representing the receipt to contact information for the customer. In some examples, the payment service may retrieve the contact information from a customer profile of the customer.

It should be noted that, in some examples, the payment service may receive transaction data from the POS device of the merchant rather that a request to authorize a transaction. For instance, if the customer pays in cash (and/or using some other type of payment instrument that does not require authorization by the payment service), the payment service may receive transaction data that includes the item and a cost of the item. The payment service can then generate the receipt based on the transaction data using the template stored in the merchant profile for the merchant.

Figure 7:
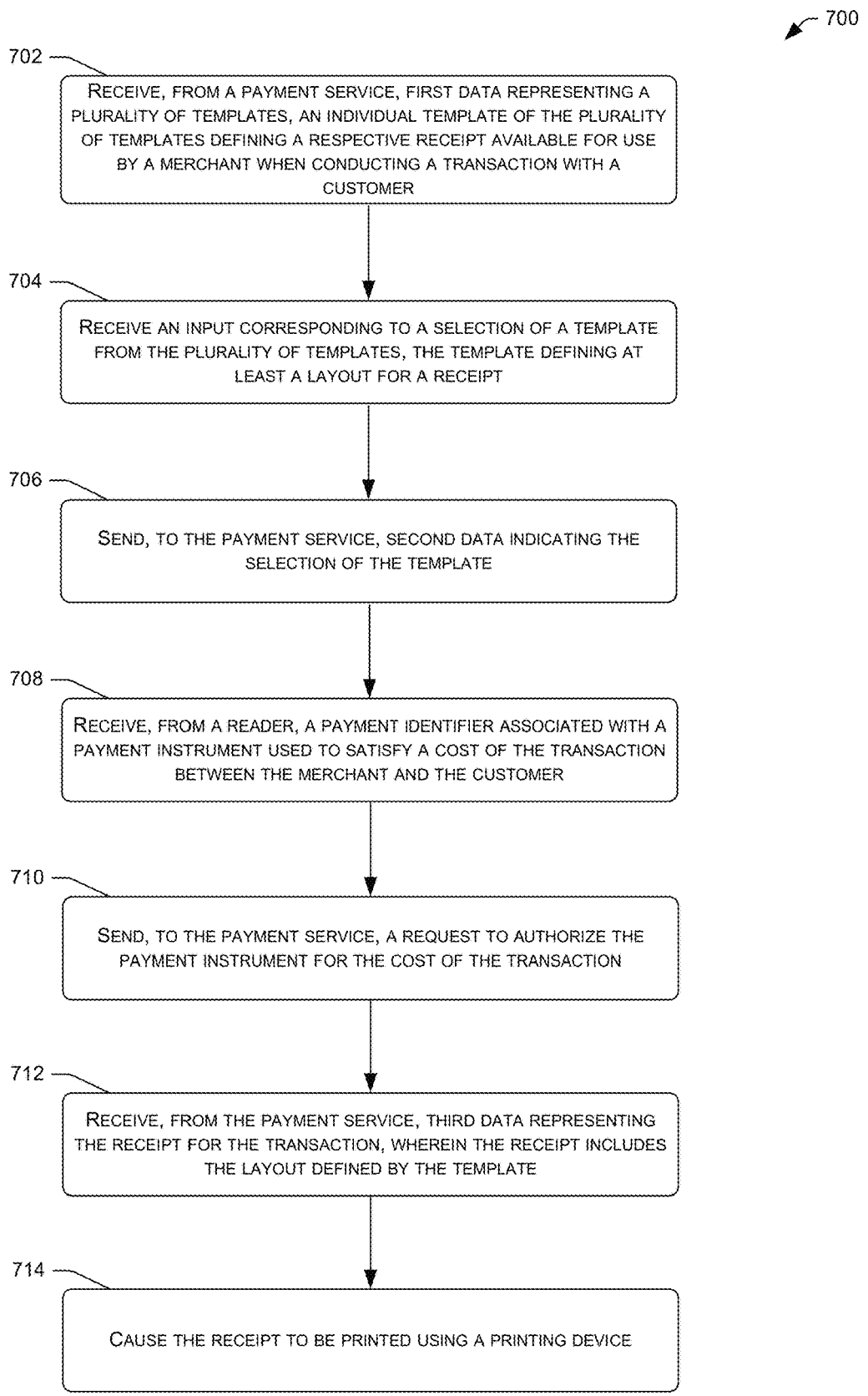
FIG. 7 illustrates a flow diagram of an example process for receiving receipt templates from a payment service and then sending a selected receipt template to the payment service. The example process further includes sending transaction information to the payment service and receiving data representing a receipt for the transaction from the payment service.

FIG. 7 illustrates a flow diagram of an example process 700 for receiving receipt templates from a payment service and then sending a selected receipt template to the payment service. The example process 700 further includes sending transaction information to the payment service and receiving data representing a receipt for the transaction from the payment service.

At 702, the process 700 receives, from a payment service, first data representing a plurality of templates, an individual template of the plurality of templates defining a respective receive is available for use by a merchant when conducting a transaction with a customer. For instance, a POS device of a merchant may receive data representing a plurality of templates defining receipts from a payment service. In some examples, each of the templates can define a respective receipt that is available for use by the merchant when conducting transactions with customers. For instance, each template may define a layout of the receipt, text included in the receipt, and one or more graphics included in the receipt. In some examples, one or more of the templates can further allow a merchant to customize the receipt defined by the respective template. For instance, a merchant can customize the layout, the text, or the one or more graphics included in the receipt.

AT 704, the process 700 receives an input corresponding to a selection of a template from the plurality of templates, the template defining at least a layout for a receipt. For instance, the POS device may provide a user interface that includes one or more templates of the plurality of templates. The POS device can then receive input from the merchant corresponding to a selection of a template from the one or more templates. In some examples, the merchant can further use the user interface to customize a layout of the receipt, text included in the receipt, or one or more graphics included in the receipt. The merchant can also specify one or more situations for when to use the template to generate a receipt.

At 706, the process 700 sends, to the payment service, second data indicating the selection of the template. For instance, the POS device can send data indicating the selection of the template to the payment service. In some examples, the POS device can further send data indicating the one or more situations for when to use the template to generate a receipt.

At 708, the process 700 receives, from a reader, a payment identifier associated with a payment instrument used to satisfy a cost of the transaction with the customer and at 710, the process 700 sends, to the payment service, a request to authorize the payment instrument for the cost of the transaction. For instance, the POS device can receive the payment identifier associated with the payment instrument from a card reader of the POS device. The POS device can then send a request to authorize the payment instrument for the cost of the item to the payment service and in response, receive an indication of whether the payment instrument was authorized or was not authorized from the payment service.

AT 710, the process 700 receives, from the payment service, third data representing the receipt for the transaction, wherein the receipt includes the layout defined by the template. For instance, the POS device can receive data representing the receipt from the payment service. The receipt can include the layout, text, and one or more or more graphics as defined by the template selected by the merchant. The receipt can further include information related to the transaction between the merchant and the customer. For instance, in some examples, the receipt can further include a portion of and/or all of the transaction information.

AT 712, the process 700 causes the receipt to be printed using a printing device. For instance, the POS device can use a printer to print a physical copy of the receipt. The merchant can then provide the customer with the physical receipt. Additionally or alternatively, in some examples, the merchant can use the POS device to send a digital copy of the receipt to an electronic device of the customer.

It should be noted that, in some examples, a similar process may be used with regard to customers. For instance, a device associated with a customer may receive data representing receipt templates from the payment service, receive input corresponding to a selection of a receipt template, and send data indicating the selection of the receipt template to the payment service. In some examples, the payment service may then store the selected receipt template in a customer profile associated with the customer. The payment service can then use the template selected by the customer when generating a receipt for a transaction between the customer and the merchant.

Figure 8A:
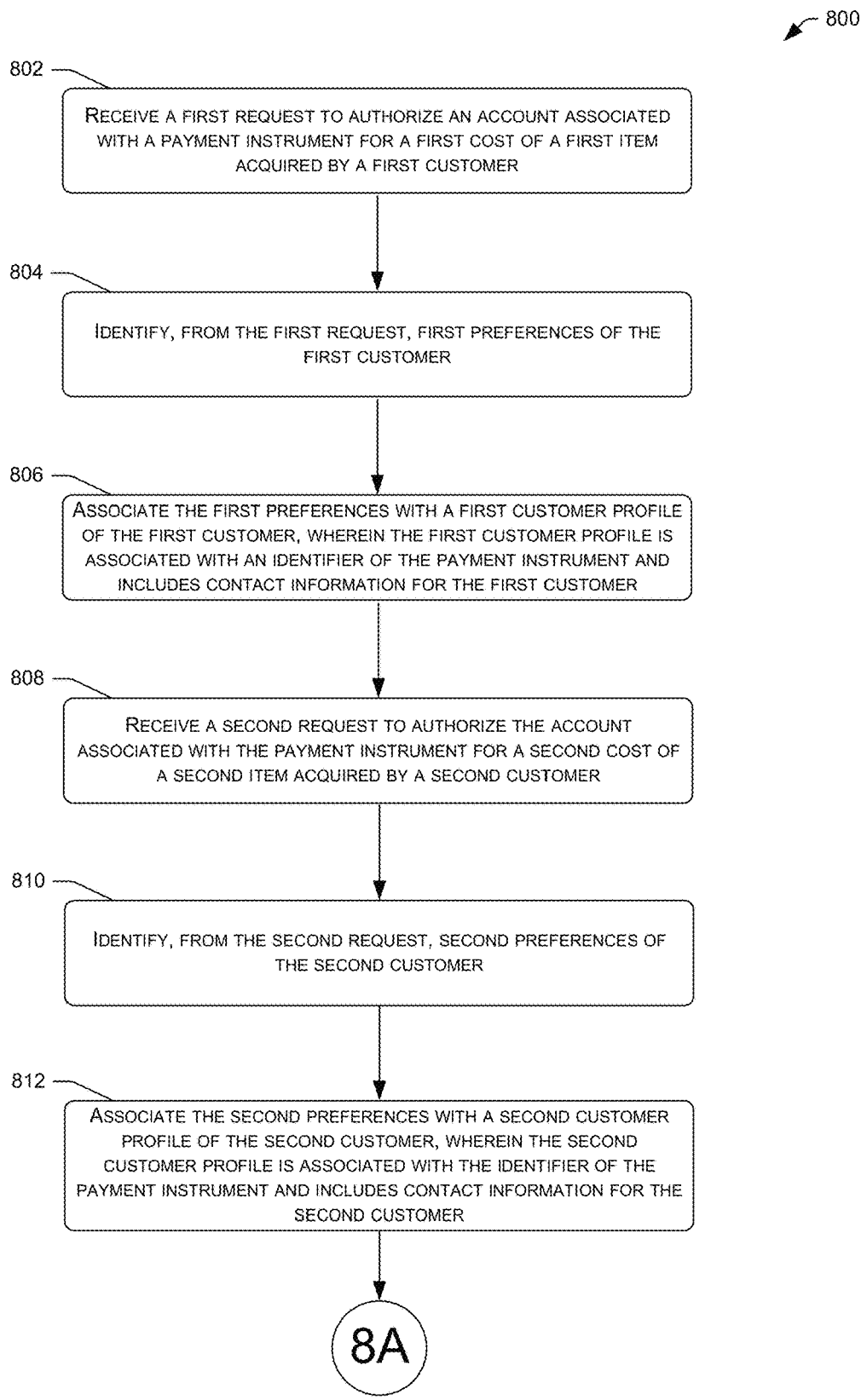
FIGS. 8A-8C illustrate a flow diagram of an example process for generating customer profiles based on transaction data, where the customer profiles are associated with a payment instrument. The example process further uses the customer profiles to determine which customer a transaction is associated with when transaction information includes the payment instrument.
Figure 8B:
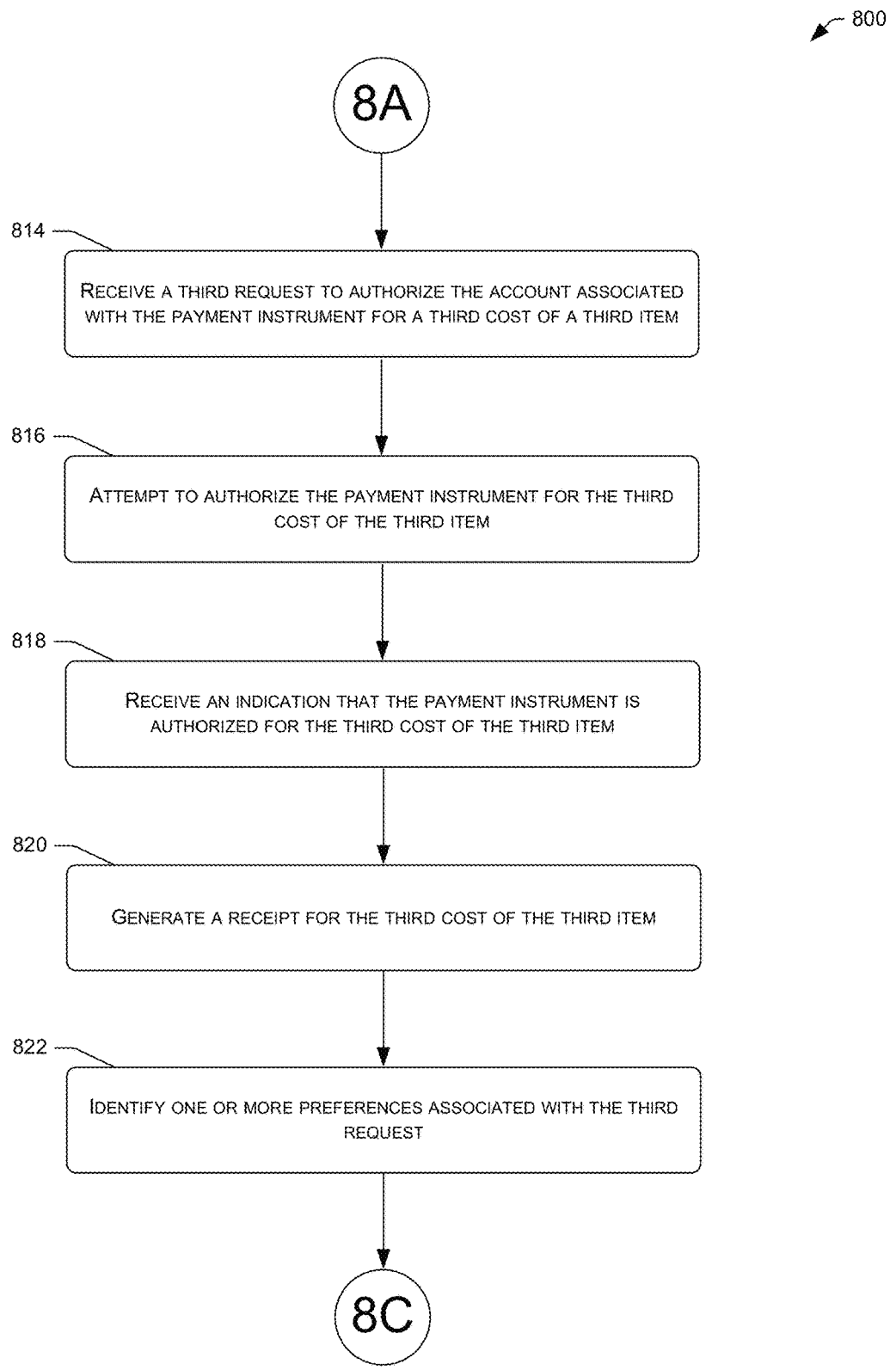
Figure 8C:
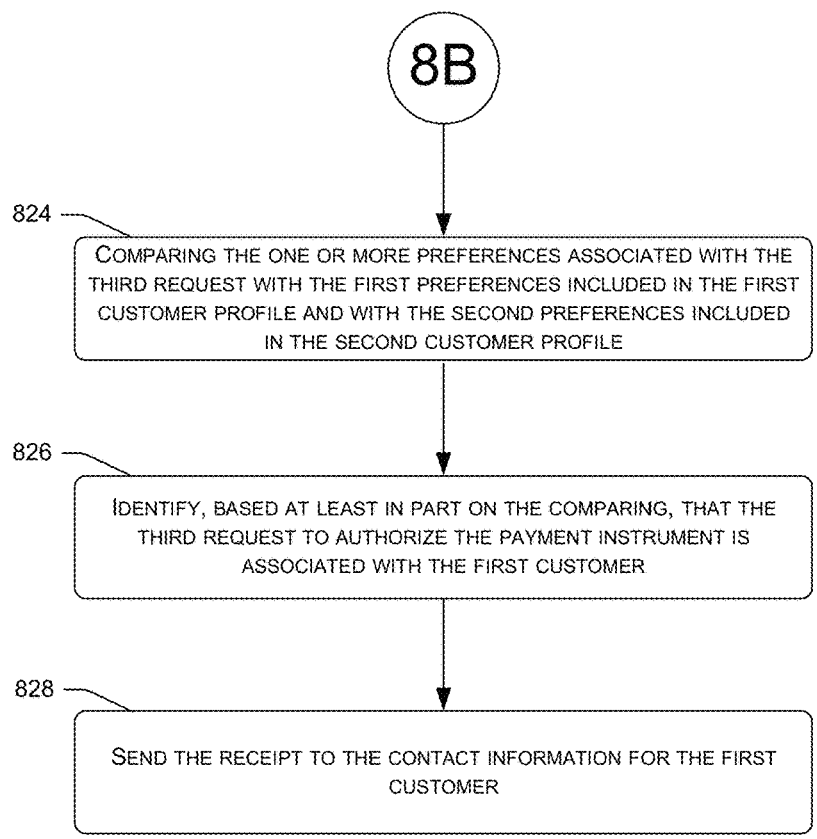

FIGS. 8A-8C illustrate a flow diagram of an example process 800 for generating customer profiles based on transaction data, where the customer profiles are associated with a payment instrument. The example process 800 further uses the customer profiles to determine which customer a transaction is associated with when transaction information includes the payment instrument.

At 802, the process 800 receives a first request to authorize an account associated with a payment instrument for a first cost of a first item acquired by a first customer and at 804, the process 800 identifies, from the first request, first preferences of the first customer. For instance, a payment service may receive a first request to authorize an account associated with a payment instrument for a first customer from a first POS device. The payment service can then use the first request to identify at least one of an item preference, time preference, and a location preference for the first customer.

At 806, the process 800 associates the first preferences with a first customer profile of the first customer, wherein the first customer profile is associated with an identifier of the account associated with the payment instrument and includes contact information for the first customer. For instance, the payment service may generate a first customer profile for the first customer if there is not already one stored at the payment service. The payment service can then determine contact information for the first customer (either by sending a request to the first POS device or a device of the first customer) and store the contact information in the first customer profile. Additionally, the payment service can associate the first customer profile with an identifier of the payment instrument and store the first preferences in the first customer profile.

At 808, the process 800 receives a second request to authorize the account associated with the payment instrument for a second cost of a second item acquired by a second customer and at 808, the process 800 identifies, from the second request, second preferences of the second customer. For instance, the payment service may receive a second request to authorize the account associated with the payment instrument for a second customer from the first POS device or a second POS device. The payment service can then use the second request to identify at least one of an item preference, time preference, and a location preference for the second customer.

At 812, the process 800 associates the second preferences with a second customer profile of the second customer, wherein the second customer profile is associated with the identifier of the payment instrument and includes contact information for the second customer. For instance, the payment service may generate a second customer profile for the second customer if there is not already one stored at the payment service. The payment service can then determine contact information for the second customer (either by sending a request to the first POS device and/or the second POS device, or sending a request to a device of the second customer) and store the contact information in the second customer profile. Additionally, the payment service can associate the second customer profile with the payment instrument and store the second preferences in the second customer profile.

At 814, the process 800 receives a third request to authorize the account associated with the payment instrument for a third cost of a third item. For instance, the payment service can receive a request to authorize account associated with the payment instrument from one of the first POS device, the second POS device, or a third POS device.

At 816, the process 800 attempts to authorize the payment instrument for the third cost of the third item and at 818, the process 800 receives an indication that the payment instrument is authorized for the third cost of the third item. For instance, the payment service may communicate with one or more computing devices of one or more banks, processing/acquiring services, or the like to authorize the payment instrument for the third cost of the third item. The payment service may then receive an indication from the one or more computing devices of one or more banks, processing/acquiring services, or the like that the payment instrument is authorized for the third cost of the third item.

At 820, the process 800 generates a receipt for the third cost of the third item. For instance, the payment service can generate a receipt for the third cost of the third item using the third request. In some examples, the payment service may generate the receipt using a receipt template selected by a merchant that is conducting the transaction associated with the third request. In some examples, the payment service generates the third receipt after identifying a customer that is conducting the transaction. The payment service can then generate the receipt using a receipt template selected by the customer.

At 822, the process 800 identifies one or more preferences associated with the third request. For instance, the payment service can identify one or more preferences associated with the third request. The one or more preferences can include at least one of a type of the third item, a time of the third request, or a location of the third request.

At 824, the process 800 compares the one or more preferences associated with the third request with the first preferences included in the first customer profile and with the second preferences included in the second customer profile. For instance, the payment service can compare at least one of the type of the third item, the time of the third request, or the location of the third request with the first item preference, the first time preference, or the first location preference, respectively. The payment service can further compare at least one of the type of the third item, the time of the third request, or the location of the third request with the second item preference, the second time preference, or the second location preference, respectively.

In some examples, the payment service uses the comparing to identify similarities between the one or more preferences associated with the third request and the first preferences included in the first customer profile, and similarities between the one or more preferences associated with the third request and the second preferences included in the second customer profile.

At 826, the process 800 identifies, based at least in part on the comparing, that the third request to authorize the payment instrument is associated with the first customer. For instance, the payment service can identify the first customer based on the one or more preferences of the third request including more similarities to the first preferences included in the first customer profile than the second preferences in the second customer profile.

At 828, the process 800 sends the receipt to the contact information for the first customer. For instance, the payment service can send the receipt to the contact information stored in the first customer profile. In some examples, the contact information may include a phone number or email address of the first customer. In such examples, the payment service can send data representing the receipt to the contact information. The first customer can then use an electronic device to receive and view a digital copy of the receipt. In some examples, the contact information can include a street address of the first customer. In such examples, the payment service can send a physical copy of the receipt to the street address of the first customer.

It should be noted that, in some examples, additionally to alternatively from using preference identified and collected from previous transactions, the payment service may use general information about the customers associated with the customer profiles when identifying which customer is conducting the transaction with the customer. The general information can include the age, gender, education level, or the like of the customers.

For instance, in the example process 800 above, the payment service may identify that the third item corresponds to a type of item that females purchase more often than males. The payment service can then determine that the first customer is a female based on the general information included in the first customer profile and that the second customer is a male based on the general information included in the second customer profile. In response, the payment service may identify the customer acquiring the third item as the first customer.

Figure 9:
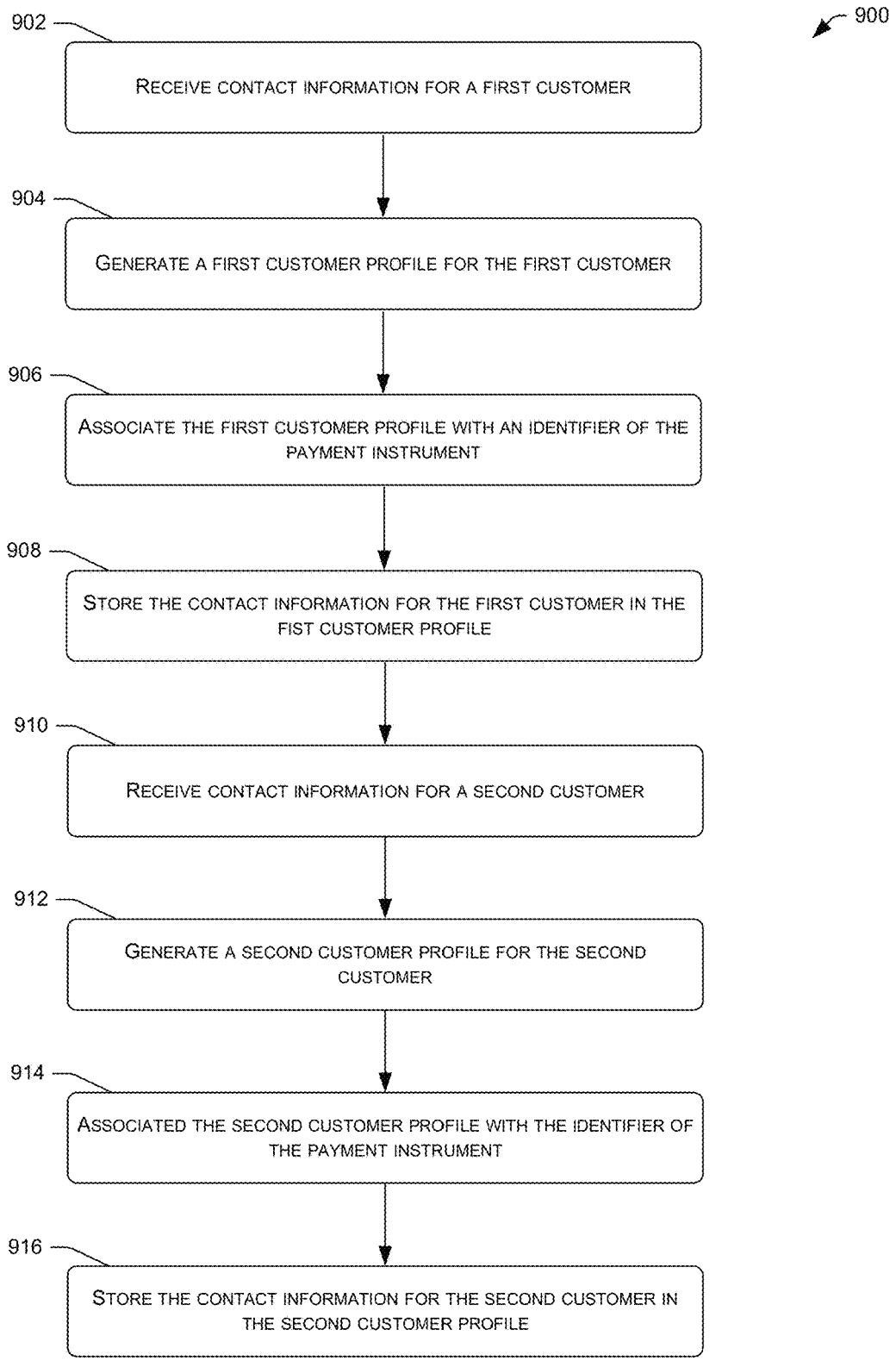
FIG. 9 illustrates a flow diagram of an example process for generating customer profiles. The example process includes, for each customer profile, associating a payment instrument with the respective customer profile and storing contact information for a customer in the respective customer profile.

FIG. 9 illustrates a flow diagram of an example process 900 for generating customer profiles. The example process 900 includes, for each customer profile, associating a payment instrument with the respective customer profile and storing contact information for a customer in the respective customer profile.

At 902, the process 900 receives contact information for a first customer. For instance, in some examples, a payment service may receive contact information for the first customer and an identifier for the payment instrument when an account is opened for the payment instrument (e.g., when the payment instrument is activated). In some examples, the payment service may receive the contact information for the first customer and the identifier for the payment instrument when the payment service receives a request to authorize a transaction between the first customer and a merchant, where the transaction is associated with the payment instrument.

At 904, the process 900 generate a first customer profile for the first customer and at 906, the process 900 associates the first customer profile with an identifier of the payment instrument. For instance, the payment service may generate data representing the first customer profile, and then store the data in a database of customer profiles. In some examples, the payment service may further associate an identifier of the payment instrument with the first customer profile by storing an identifier for the payment instrument in the first customer profile.

At 908, the process 900 stores the contact information for the first customer in the first customer profile. For instance, the payment service can store the contact information for the first customer in the first customer profile. Additionally, in some examples, the payment service may store general information (e.g., age, gender, education level, or the like) about the first customer in the first customer profile.

At 910, the process 900 receives contact information for a second customer. For instance, in some examples, the payment service may receive contact information for the second customer and an identifier for the payment instrument when an account is opened for the payment instrument (e.g., when the payment instrument is activated). In such examples, the payment service can receive the contact information for the second customer at a time of receiving the contact information for the first customer. In some examples, the payment service may receive the contact information for the second customer and the identifier for the payment instrument when the payment service receives a request to authorize a transaction between the second customer and a merchant, where the transaction is associated with the payment instrument.

At 912, the process 900 generate a second customer profile for the second customer and at 914, the process 900 associates the second customer profile with the identifier of the payment instrument. For instance, the payment service may generate data representing the second customer profile, and then store the data in a database of customer profiles. In some examples, the payment service may further associate the payment instrument with the second customer profile by storing an identifier for the payment instrument in the second customer profile.

At 916, the process 900 stores the contact information for the second customer in the second customer profile. For instance, the payment service can store the contact information for the second customer in the second customer profile. Additionally, in some examples, the payment service may store general information (e.g., age, gender, education level, or the like) about the second customer in the second customer profile.

Figure 10:
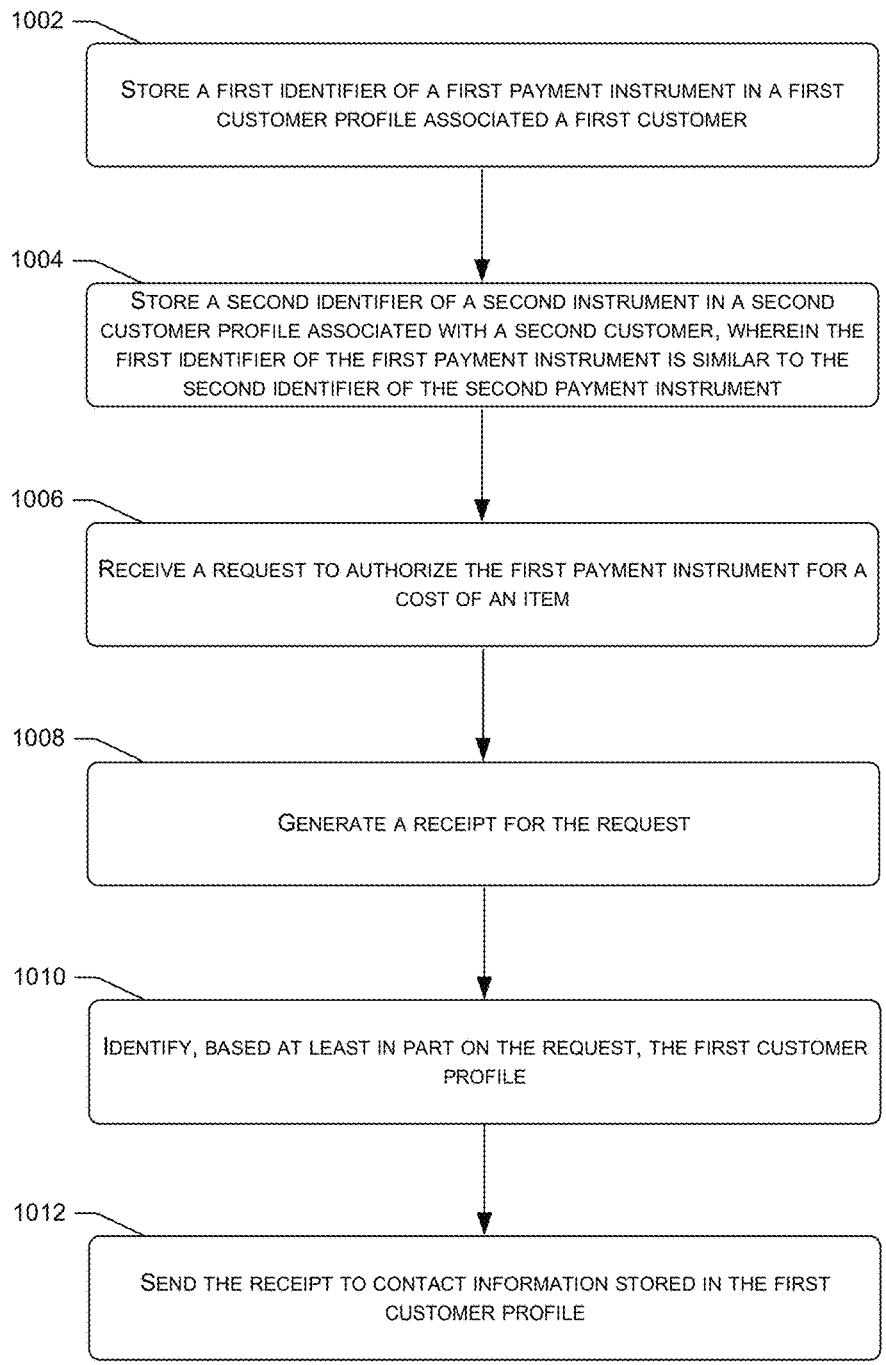
FIG. 10 illustrates a flow diagram of an example process for using customer profiles in order to identify a customer that is using a payment instrument. In the example process, each customer profile includes an identifier for a payment instrument, where the identifiers for the payment instruments are similar to one another.

FIG. 10 illustrates a flow diagram of an example process 1000 for using customer profiles in order to identify a customer that is using a payment instrument. In the example process 1000, each customer profile includes an identifier for a payment instrument, where the identifiers for the payment instruments are similar to one another.

At 1002, the process 1000 stores a first identifier of a first payment instrument in a first customer profile associated with a first customer. For instance, a payment service may receive data (e.g., transaction data) that associates the first customer with the first payment instrument. The payment service can then store a first identifier of the first payment instrument in a first customer prolife associated with the first customer. In some examples, the first customer profile includes contact information for the first customer.

At 1004, the process 1000 stores a second identifier of a second payment instrument in a second customer profile associated with a second customer, wherein the first identifier of the first physical payment instrument is similar to the second identifier of the second payment instrument. For instance, a payment service may receive data (e.g., transaction data) that associates the second customer with the second payment instrument. The payment service can then store a second identifier of the second physical payment instrument in a second customer prolife associated with the second customer. In some examples, the second customer profile includes contact information for the second customer.

In the example process 1000, the first identifier of the first payment instrument may be similar to the second identifier of the second payment instrument. For instance, in some examples, the first identifier and the second identifier may correspond to a similar account number. In such examples, the first payment instrument may include a physical payment instrument provided to the first customer that identifies the first customer and the second payment instrument may include a physical instrument provided to the second customer that identifies the second customer.

At 1006, the process 1000 receives a request to authorize the first payment instrument for a cost of an item and at 1008, the process 1000 generates a receipt for the request. For instance, the payment service can receive a request to authorize the first payment instrument from a POS device. The payment service can then generate a receipt for the request using an identity of the item and a cost of the item.

At 1010, the process 1000 identifies, based at least in part on the request, that the first customer is associated with the request and at 1012, the process 1000 sends the receipt to contact information stored in the first customer profile. For instance, the payment service can identify the first identifier of the first payment instrument from the request. The payment service can then compare the first identifier of the first payment instrument with the first customer profile and the second customer profile. At least in part on identifying that the first customer profile includes the first identifier of the first payment instrument, the payment service can determine that the first customer is associated with the request. The payment service can then send the receipt to contact information stored in the first customer profile.

Figure 11:
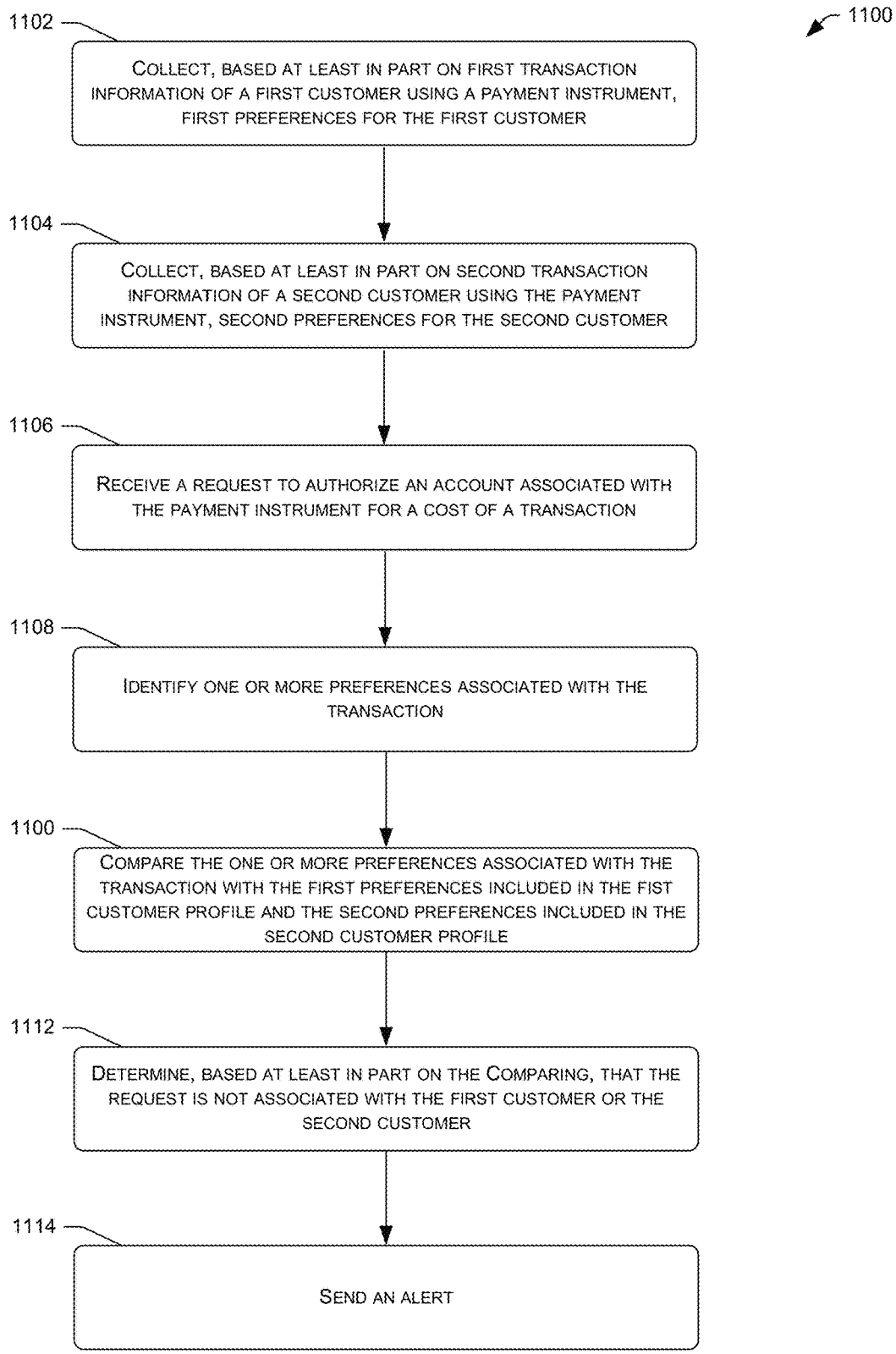
FIG. 11 illustrates a flow diagram of an example process for determining that a transaction is fraudulent using customer profiles. The example process further includes sending an alert based on the determining.

FIG. 11 illustrates a flow diagram of an example process 1100 for determining that a transaction is fraudulent using customer profiles. The example process 1100 further includes sending an alert based on the determining.

At 1102, the process 1100 collects, based at least in part on first transaction information of a first customer using a payment instrument, first preferences for the first customer. For instance, the payment service can receive first transaction information of the first customer from one or more POS devices. The payment service can use the first payment information to identify first preferences of the first customer. As discussed above, the first preferences can include at least a first item preference, a first time preference, and a first location preference.

At 1104, the process 1100 collects, based at least in part on second transaction information of a second customer using the payment instrument, second preferences for the second customer. For instance, the payment service can receive second transaction information of the second customer from one or more POS devices. The payment service can use the second transaction information to identify second preferences of the second customer. As discussed above, the second preferences can include at least a second item preference, a second time preference, and a second location preference.

At 1106, the process 1100 receives a request to authorize an account associated with the payment instrument for a cost of a transaction and at 1108, the process 1100 identifies one or more preferences associated with the transaction. For instance, the payment service can receive a request to authorize an account associated with the payment instrument for a cost of a transaction from a POS device. The payment service can then use the request to identify one or more preferences associated with the transaction. For instance, as discussed above, the one or more preferences can include at least one of a type of item acquired during the transaction, a time of the transaction, or a location of the transaction.

At 1110, the process 1100 compares the one or more preferences associated with the transaction with the first preferences included in the first customer profile and the second preferences in the second customer profile. For instance, the payment service can compare at least one of the type of the item, the time of the transaction, or the location of the transaction with the first item preference, the first time preference, or the first location preference, respectively. The payment service can further compare at least one of the type of the item, the time of the transaction, or the location of the transaction with the second item preference, the second time preference, or the second location preference, respectively.

At 1112, the process 1100 determines, based at least in part on the comparing, that the request is not associated with the first customer or the second customer. For instance, the payment service can determine that the request is not associated with the first customer based on a number of similarities between the one or more preferences associated with the transaction and the first preferences included in the first customer profile being below a threshold number of similarities (e.g., no similarities, only one similarity, or the like). The payment service can further determine that the request is not associated with the second customer based on a number of similarities between the one or more preferences associated with the transaction and the second preferences included in the second customer profile being below the threshold number of similarities.

At 1114, the process 1100 sends an alert. For instance, the payment service may generate an alert to notify one or more of a merchant associated with the transaction, the first customer, or the second customer that a fraudulent customer is trying to use the payment instrument. The payment service can then send the alert to at least one of a merchant device of the merchant, a device of the first customer, or a device of the second customer.

Figure 12:
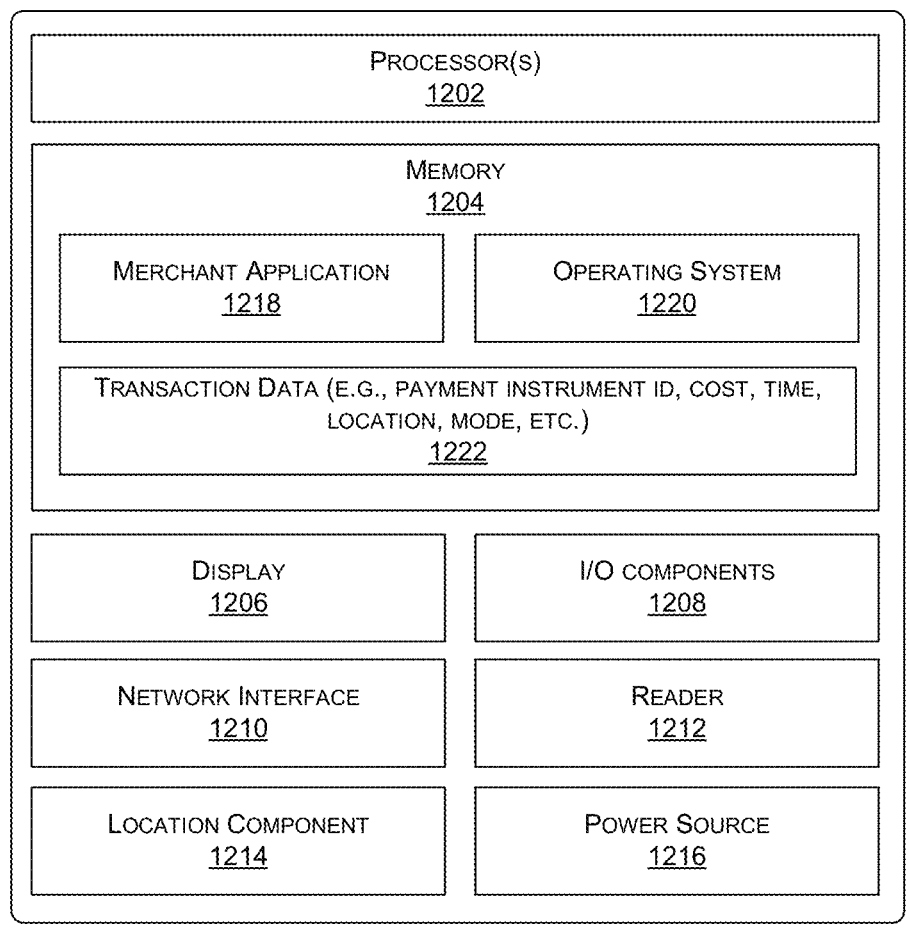
FIG. 12 illustrates select components of a POS device that merchants described herein may utilize.

FIG. 12 illustrates select example components of an example POS device 1200 according to some implementations. The POS device 1200 may be any suitable type of computing device, e.g., mobile, semi-mobile, semi-stationary, or stationary. Some examples of the POS device 1200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 1200 includes at least one processor 1202, memory 1204, a display 1206, one or more input/output (I/O) components 1208, one or more network interfaces 1210, at least one card reader 1212, at least one location component 1214, and at least one power source 1216. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the memory 1204.

Depending on the configuration of the POS device 1200, the memory 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1204 may include, but is not limited to, RAM, ROM, EEPROM, flash memory, solid-state storage, magnetic disk storage, optical storage, and/or other computer-readable media technology. Further, in some cases, the POS device 1200 may access external storage, such as RAID storage systems, storage arrays, network attached storage, storage area networks, cloud storage, or any other medium that can be used to store information and that can be accessed by the processor 1202 directly or through another computing device or network. Accordingly, the memory 1204 may be computer storage media able to store instructions, modules or components that may be executed by the processor 1202. Further, when mentioned, non-transitory computer-readable media exclude media such as energy, carrier signals, electromagnetic waves, and signals per se.

The memory 1204 may be used to store and maintain any number of functional components that are executable by the processor 1202. In some implementations, these functional components comprise instructions or programs that are executable by the processor 1202 and that, when executed, implement operational logic for performing the actions and services attributed above to the POS device 1200. Functional components of the POS device 1200 stored in the memory 1204 may include a merchant application 1218, which may interact with applications executing on client devices to allow customers to pay for items offered by the merchant. The merchant application 1218 may present an interface on the POS device 1200 to enable the merchant to conduct transactions, receive payments, and so forth, as well as communicating with the payment service 108 for processing payments and sending transaction information. Further, the merchant application 1218 may present an interface to enable the merchant to manage the merchant's account, and the like. Finally, the merchant application 1218 may send data associated with the merchant to the payment service, and receive suggested gift card orders and values to associate with gift cards from the payment service.

Additional functional components may include an operating system 1220 for controlling and managing various functions of the POS device 1200 and for enabling basic user interactions with the POS device 1200. The memory 1204 may also store transaction data 1222 that is received based on the merchant associated with the POS device 1200 engaging in various transactions with customers, such as the example customer 106 from FIG. 1.

In addition, the memory 1204 may also store data, data structures and the like, that are used by the functional components. For example, this data may include item information that includes information about the items offered by the merchant, which may include images of the items, descriptions of the items, prices of the items, and so forth.

Depending on the type of the POS device 1200, the memory 1204 may also optionally include other functional components and data, which may include programs, drivers, etc., and the data used or generated by the functional components. Further, the POS device 1200 may include many other logical, programmatic and physical components, of which those described are merely examples that are related to the discussion herein.

The network interface(s) 1210 may include one or more interfaces and hardware components for enabling communication with various other devices over the network or directly. For example, network interface(s) 1210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 12 further illustrates that the POS device 1200 may include the display 1206 mentioned above. Depending on the type of computing device used as the POS device 1200, the display 1206 may employ any suitable display technology. For example, the display 1206 may be a liquid crystal display, a plasma display, a light emitting diode display, an OLED (organic light-emitting diode) display, an electronic paper display, or any other suitable type of display able to present digital content thereon. In some examples, the display 1206 may have a touch sensor associated with the display 1206 to provide a touchscreen display configured to receive touch inputs for enabling interaction with a graphic interface presented on the display 1206. Accordingly, implementations herein are not limited to any particular display technology. Alternatively, in some examples, the POS device 1200 may not include the display 1206, and information may be present by other means, such as aurally.

The I/O components 1208, meanwhile, may include speakers, a microphone, a camera, and various user controls (e.g., buttons, a joystick, a keyboard, a keypad, etc.), a haptic output device, and so forth. For instance, I/O components 1208 can include a printing device for printing physical receipts for customers. In some examples, the POS device uses the printing device to print the physical receipts after receiving data representing the receipts from a payment service.

It should be noted that, in some examples, the I/O components 1208 may be separate from the POS device 1200. For instance, the printing device may be separate from the POS device 1200. In some examples, the POS device 1200 sends data representing the receipts to the printing device in order to cause the printing device to print physical receipts.

In addition, the POS device 1200 may include or may be connectable to a payment instrument reader 1212. In some examples, the reader 1212 may plug in to a port in the merchant device, such as a microphone/headphone port, a data port, or other suitable port. In other instances, the reader 1212 is integral with the entire POS device 1200. The reader 1212 may include a read head for reading a magnetic strip of a payment card, and further may include encryption technology for encrypting the information read from the magnetic strip. Alternatively, numerous other types of card readers may be employed with the POS devices 1200 herein, depending on the type and configuration of a particular POS device 1200.

The location component 1214 may include a GPS device able to indicate location information, or the location component 1214 may comprise another other location-based sensor. The POS device 1200 may also include one or more additional sensors (not shown), such as an accelerometer, gyroscope, compass, proximity sensor, and the like. Additionally, the POS device 1200 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computer-implemented method comprising:
storing, in a data store associated with a payment service, an account that is associated with at least two user profiles of at least two users associated with the payment service;
receiving transaction data associated with a transaction, wherein the transaction data includes an identifier associated with a payment instrument of a user;
identifying, using the identifier, the account that is associated with the at least two user profiles;
determining, based at least in part on the transaction data and stored data associated with previous transactions of one or more users using the payment service, to which of the at least two user profiles the transaction is relevant; and
presenting a record of the transaction via a user interface of a computing device of each user associated with each user profile to which the transaction is determined to be relevant.

2. The computer-implemented method as claim 1 recites, wherein the account is associated with a plurality of payment instruments including the payment instrument.

3. The computer-implemented method as claim 2 recites, wherein individual ones of the plurality of payment instruments are associated with a same payment instrument number.

4. The computer-implemented method as claim 1 recites, wherein the record of the transaction includes an indication of which of the at least two user profiles the transaction is relevant.

5. The computer-implemented method as claim 1 recites, further comprising customizing the record of the transaction for a user corresponding to a user profile determined to be relevant to the transaction.

6. The computer-implemented method as claim 1 recites, wherein determining to which of the at least two user profiles the transaction is relevant comprises determining the transaction is relevant to a first user profile of a first user of the at least two users and is not relevant to a second user profile of a second user of the at least two users.

7. The computer-implemented method as claim 6 recites, wherein presenting the record of the transaction via the user interface of the computing device of each user associated with each user profile to which the transaction is determined to be relevant comprises presenting the record of the transaction via a first user interface of a first computing device of the first user and not presenting the record of the transaction via a second user interface of a second computing device of the second user.

8. The computer-implemented method as claim 7 recites, wherein the record of the transaction presented via the first user interface of the first computing device of the first user includes a selectable icon that, when selected, causes transmission of information associated with the record of the transaction to the second computing device of the second user.

9. The computer-implemented method as claim 6 recites, wherein presenting the record of the transaction via the user interface of the computing device of each user associated with each user profile to which the transaction is determined to be relevant comprises presenting the record of the transaction via a second user interface of a second computing device of the second user and not presenting the record of the transaction via a first user interface of a first computing device of the first user.

10. The computer-implemented method as claim 1 recites, wherein determining to which of the at least two user profiles the transaction is relevant comprises determining the transaction is relevant to the at least two user profiles.

11. The computer-implemented method as claim 10 recites, wherein presenting the record of the transaction via the user interface of the computing device of each user associated with each user profile to which the transaction is determined to be relevant comprises presenting the record of the transaction via a first user interface of a first computing device of a first user and via a second user interface of a second computing device of a second user.

12. The computer-implemented method as claim 1 recites, wherein the at least two users have an established relationship with each other.

13. A system comprising:
one or more processors; and
one or more computer-readable media storing instructions that, when executed by the one or more processors, cause the system to perform operations comprising:
storing, in a data store associated with a payment service, an account that is associated with a plurality of user profiles, wherein an individual user profile of the plurality of user profiles corresponds to a user of a plurality of users associated with the payment service;
receiving transaction data associated with a transaction, wherein the transaction data includes an identifier associated with a payment instrument;
identifying, using the identifier, the account that is associated with the plurality of user profiles;
determining, based at least in part on the transaction data, to which of the plurality of user profiles the transaction is relevant; and
presenting, via a user interface of a computing device, a record of the transaction to a user associated with a user profile that is determined to be relevant.

14. The system as claim 13 recites, wherein the record of the transaction is associated with a promotion offered by a merchant associated with the transaction.

15. The system as claim 13 recites, wherein the payment instrument comprises at least one of a debit card, a credit card, a stored-value card, a gift card, or an electronic payment application.

16. A computer-implemented method comprising:
storing, in a data store associated with a payment service, an account that is associated with at least two users associated with the payment service;
receiving transaction data associated with a transaction, wherein the transaction data includes an identifier associated with a payment instrument;
identifying, using the identifier, the account that is associated with the at least two users;
determining, based at least in part on the transaction data and stored data associated with previous transactions of one or more users using the payment service, that the transaction is relevant to at least one of the at least two users; and sending a record of the transaction to the at least two users.

17. The computer-implemented method as claim 16 recites, further comprising:

based on at least one of the account or the transaction data, determining one or more preferences of at least one of the at least two users.

18. The computer-implemented method as claim 17 recites, wherein the one or more preferences include at least one of:

a time associated with the transaction;

one or more items associated with the transaction; or a location associated with the transaction.

19. The computer-implemented method as claim 17 recites, wherein determining the one or more preferences comprises determining the one or more preferences based at least in part on data associated with similar users to the at least two users.

20. The computer-implemented method as claim 17 recites, wherein the at least two users have an established relationship with each other.

* * * * *